US006718347B1

(12) United States Patent
Wilson

(10) Patent No.: US 6,718,347 B1
(45) Date of Patent: Apr. 6, 2004

(54) METHOD AND APPARATUS FOR MAINTAINING COHERENCE AMONG COPIES OF A DATABASE SHARED BY MULTIPLE COMPUTERS

(75) Inventor: Robert Wilson, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/225,577

(22) Filed: Jan. 5, 1999

(51) Int. Cl.[7] ............................................. G06F 17/30
(52) U.S. Cl. .................... 707/201; 707/10; 707/100; 707/104.1; 707/202
(58) Field of Search ................ 707/1–10, 100–104, 707/200–206, 104.1; 713/100, 103, 153; 705/39; 709/201, 217

(56) References Cited

U.S. PATENT DOCUMENTS

| 5,544,347 | A |   | 8/1996  | Yanai et al. .................. 711/162 |
|-----------|---|---|---------|----------------------------------------|
| 5,710,922 | A | * | 1/1998  | Alley et al. .................. 707/201 |
| 5,832,489 | A | * | 11/1998 | Kucala ......................... 707/10 |
| 5,832,499 | A | * | 11/1998 | Gustman ..................... 707/103 |
| 5,845,293 | A | * | 12/1998 | Veghte et al. ................ 707/202 |
| 5,862,325 | A | * | 1/1999  | Reed et al. .................. 709/210 |
| 5,890,218 | A | * | 3/1999  | Ogawa et al. ............... 711/148 |
| 5,926,624 | A | * | 7/1999  | Katz et al. .................. 709/217 |
| 5,926,816 | A | * | 7/1999  | Bauer et al. ................... 707/8 |
| 5,933,653 | A | * | 8/1999  | Ofek .............................. 710/6 |
| 5,960,216 | A |   | 9/1999  | Vishlitzky et al. ............. 710/74 |
| 5,968,170 | A | * | 10/1999 | Gross et al. ................... 713/1 |
| 5,987,550 | A |   | 11/1999 | Shagam ....................... 710/119 |
| 6,000,000 | A | * | 12/1999 | Hawkins et al. ............. 707/201 |
| 6,006,274 | A | * | 12/1999 | Hawkins et al. ............. 709/248 |
| 6,088,717 | A | * | 7/2000  | Reed et al. .................. 709/210 |
| 6,092,080 | A | * | 7/2000  | Gustman ..................... 707/102 |
| 6,101,508 | A | * | 8/2000  | Wolff ............................ 707/1 |
| 6,128,734 | A | * | 10/2000 | Gross et al. ................. 713/100 |
| 6,154,744 | A | * | 11/2000 | Kenner et al. ................ 707/10 |
| 6,157,991 | A |   | 12/2000 | Arnon ......................... 711/161 |
| 6,182,166 | B1|   | 1/2001  | Shklarsky et al. ............ 710/33 |
| 6,233,687 | B1| * | 5/2001  | White ......................... 713/201 |
| 6,237,008 | B1| * | 5/2001  | Beal et al. ................... 707/204 |
| 6,275,831 | B1| * | 8/2001  | Bodnar et al. ............... 707/201 |
| 6,308,284 | B1| * | 10/2001 | LeCrone et al. ............... 714/6 |
| 6,324,654 | B1| * | 11/2001 | Wahl et al. ...................... 714/6 |
| 6,405,294 | B1| * | 6/2002  | Hayter ......................... 711/162 |
| 6,434,156 | B1| * | 8/2002  | Yeh ............................. 370/401 |

OTHER PUBLICATIONS

Wilson et al., "Method and Apparatus for Implementing a Remote Mirroring Data Facility," U.S.S.N. 08/935,844, filed Sep. 23, 1997.

* cited by examiner

Primary Examiner—Hani M. Kazimi
Assistant Examiner—Ella Colbert
(74) Attorney, Agent, or Firm—Wolf, Greenfield & Sacks, P.C.

(57) ABSTRACT

A method for use in a computer system including first and second computers and first and second storage systems, wherein the first storage system is coupled to the first computer to store data transferred from the first computer to the first storage system and the second storage system is coupled to the second computer to store data transferred from the second computer to the second storage system. The method is for updating data stored on at least one of the first and second storage systems, and includes updating a first logical volume of data stored on the first storage system with a first set of data transferred from the first computer to the first storage system; receiving, at the first storage system, a second set of data transmitted from the second storage system to the first storage system via at least one communication path that does not pass through the first computer; and updating the first logical volume of data with the second set of data transmitted from the second storage system.

61 Claims, 16 Drawing Sheets

METHOD AND APPARATUS FOR MAINTAINING COHERENCE AMONG COPIES OF A DATABASE SHARED BY MULTIPLE COMPUTERS

BACKGROUND OF THE INVENTION

1. Field of the Invention

The present invention is directed to a method and apparatus for maintaining coherence among multiple copies of a database shared by multiple computers. The invention may be used, for example, in a system in which multiple Web servers, each having a respective copy of a database, together form a single virtual Web server on the Internet, and in which it is desirable to maintain coherence among the multiple copies of the database.

2. Discussion of Related Art

As the Internet has become increasingly popular, greater numbers of Web sites are being added to the Internet each day. A Web site is typically implemented by a so called Web server that is connected to the Internet and has a particular Web site address. The Web site is accessed by users designating the appropriate address for the Web site, which results in a connection being formed through the Internet between the user and the Web site.

As will be appreciated by those skilled in the art, a Web server is typically implemented via a computer that executes an application program that performs the desired functions for the Web server. An example of a typical Web server 100 is shown in FIG. 1. As shown, the Web server 100 includes a processor 104, a memory 106, and a network interface unit 110 that interfaces the Web server to the Internet or other network cloud 114. The network interface unit 110 permits one or more network users 116 to communicate with the Web server 100 over the network cloud 114. The processor 104 executes an application program stored in the memory 106 to perform the functions of the Web server. These functions will vary depending upon the type of Web site that the Web server implements. For example, the Web server 100 may respond to requests from the network users 116, and/or permit the network users to access Web site data stored (e.g., in a database) in the memory 106, or in a storage system 118 coupled to the processor 104 by a link 112. The Web server 100 may also include one or more user input devices 108 (e.g., a keyboard and/or mouse) and a display 102 to permit a local user (e.g., a system administrator) to access to the Web server 100.

Some Web sites have become extremely popular and service numerous user accesses per day. For particularly busy Web sites, a single Web server 100 (FIG. 1) would not provide sufficient bandwidth to service the heavy traffic of user requests, so that at times some users would be unable to access the Web site. It should be appreciated that this is undesirable, particularly for certain types of Web sites. For example, for a Web site run by a commercial enterprise that conducts business over the Internet, the enterprise may experience a loss of business and revenue if its Web site is unavailable for users who desire access at any particular time.

To address the foregoing concern, some Web sites have been implemented using multiple Web servers performing in parallel, such that requests from users can be routed to the multiple Web servers and serviced simultaneously. Typically, the multiple Web servers can be distributed across a wide geographic area (e.g., on different continents) to maximize the overall performance of the Web site. An example of a Web site implemented with multiple Web servers 100a–b is shown in FIG. 2. In the illustrative example shown in FIG. 2, each of the multiple Web servers 100a–b is coupled to a plurality of users 116a–b via a network cloud 114. The Web servers 100a–b are respectively coupled to storage systems 118a–b that store data used by the Web servers. Each of the Web servers 100a–b is capable of independently implementing the Web site in much the same manner as the above-described system of FIG. 1. However, by providing multiple Web servers 100a–b, the performance of the Web site is improved because the Web servers 100a–b can process accesses from the users 116a–b in parallel.

It should be appreciated that when multiple Web servers 100a–b are employed to implement a Web site, some technique should be employed to route each specific user access to one of the Web servers 100a–b, so that the multiple Web servers 100a–b appear to the Web site users as a single virtual Web server. In the illustrative system shown in FIG. 2, this function is performed by the load balancers 206a–b, which are respectively coupled between the network cloud 114 and the Web servers 100a–b. Such load balancing devices are commercially available. For example, one such load balancer is the CISCO Local Director, available from CISCO Systems, Inc., headquartered in San Jose, California.

As mentioned above in connection with FIG. 1, a Web server 100 may include a collection of data (e.g., in a database) that is employed in implementing the Web site and servicing user accesses. In a system such as that shown in FIG. 2 wherein multiple Web servers 100a–b are provided, it should be appreciated that the database used to implement the Web site is typically replicated. Thus, one copy of the database is stored in the storage system 118a accessible to Web server 100a, and another copy is stored in the storage system 118b accessible to Web server 100b. It should be appreciated that the Web site should operate consistently irrespective of which of the Web servers 100a–b a user request is routed to. Thus, it desirable to ensure that the copies of the Web site database stored on storage systems 118a and 118b are identical. It should further be appreciated that for numerous Web sites, the database will frequently be updated based upon user accesses. Thus, some technique should be provided for maintaining coherence between the multiple copies of the database distributed amongst the storage systems 118a–b.

In conventional systems such as that shown in FIG. 2, coherence between multiple copies of the Web site database is maintained by the Web servers 100a–b, often under the control of a system administrator. For example, when the copy of the database stored on storage system 118a is updated, the Web server 100a will retrieve the updated data from its copy of the database and transfer the updated data, through the network cloud 114, to the Web server 100b, which will then update its copy of the database stored in storage system 118b accordingly. Thus, coherence between the databases is maintained by transferring updated data through the Web servers and the network cloud 114.

SUMMARY

One illustrative embodiment of the present invention is directed to a method to be employed in a computer system including first and second computers and first and second storage systems, wherein the first storage system is coupled to the first computer to store data transferred from the first computer to the first storage system and the second storage system is coupled to the second computer to store data transferred from the second computer to the second storage system. The method is for updating data stored on at least one of the first and second storage systems, and includes steps of: (A) updating a first logical volume of data stored on the first storage system with a first set of data transferred from the first computer to the first storage system; (B) receiving, at the first storage system, a second set of data transmitted from the second storage system to the first storage system via at least one communication path that does not pass through the first computer; and (C) updating the first logical volume of data with the second set of data transmitted from the second storage system.

Another illustrative embodiment of the present is directed to a method to be used in a computer system including first and second computers and first and second storage systems, wherein the first storage system is coupled to the first computer to store data transferred from the first computer to the first storage system and the second storage system is coupled to the second computer to store data transferred from the second computer to the second storage system. The method is for managing data stored on at least one of the first and second storage systems, and includes steps of: (A) in response to a first logical volume of data stored on the first storage system being updated with a first set of data transferred from the first computer to the first storage system, transmitting the first set of data from the first storage system to the second storage system over at least one communication path that does not pass through either of the first and second computers; (B) receiving, at the first storage system, a second set of data transmitted over the at least one communication path by the second storage system; and (C) updating the first logical volume with the second set of data transmitted over the at least one communication path.

Another illustrative embodiment of the present invention is directed to a method to be used in a computer system including first and second computers and first and second storage systems, wherein the first storage system is coupled to the first computer to store data transferred from the first computer to the first storage system and the second storage system is coupled to the second computer to store data transferred from the second computer to the second storage system. The method is for maintaining coherence between a data set shared by the first and second computers and stored on the first and second storage systems, and includes steps of: (A) updating the data set in the first storage system with a first group of data written to the first storage system by the first computer; (B) receiving, at the first storage system, a second group of data that is sourced from the second storage system via at least one communication path that does not pass through the first computer; and (C) overwriting at least a portion of the first group of data in the first storage system with at least a portion of the second group of data received from the second storage system.

Another illustrative embodiment of the present invention is directed to a method to be used in a computer system including first and second computers and first and second storage systems, wherein the first storage system is coupled to the first computer to store data transferred from the first computer to the first storage system and the second storage system is coupled to the second computer to store data transferred from the second computer to the second storage system. The method is for maintaining coherence between first and second copies of a data set stored, respectively, on the firsthand second storage systems, and includes steps of: (A) in response to a first group of data being written to the first copy of the data set by the first computer, transmitting the first group of data from the first storage system to the second storage system over at least one communication path that does not pass through the first computer so that the first group of data can be stored on the second storage system; (B) receiving at the first storage system, via the at least one communication path, a second group of data written to the second copy of the data set by the second computer; and (C) overwriting at least a portion of the first group of data in the first storage system with at least a portion of the second group of data.

Another illustrative embodiment of the present invention is directed to a computer system including: a first computer; a first storage system coupled to the first storage system to store data accessible to the first computer, the first storage system including at least one storage device that stores a first plurality of logical volumes of data that are visible to and writable by the first computer; a second computer; a second storage system coupled to the second computer to store data accessible to the second computer, the second storage system including at least one storage device that stores a second plurality of logical volumes of data that are visible to and writable by the second computer; at least one communication path coupled between the first and second storage systems to transfer data between the first and second storage systems, the at least one communication path not passing through the first computer; and at least one controller that mirrors one of the first plurality of logical volumes in one of the second plurality of logical volumes by transmitting updates from the first computer to the one of the first plurality of logical volumes to the one of the second plurality of logical volumes over the at least one communication path.

Another illustrative embodiment of the present invention is directed to a first storage system for use in a computer system including a first computer to be coupled to the first storage system, a second computer, and a second storage system coupled to the second computer, the second storage system including at least one storage device that stores a second plurality of logical volumes of data that are visible to and writable by the second computer, the computer system further including at least one communication path coupled between the first and second storage systems to transfer data between the first and second storage systems, the at least one communication path not passing through the first computer. The first storage system includes: at least one storage device that stores a first plurality of logical volumes of data that are visible to and writable by the first computer; and at least one write controller that updates the first plurality of logical volumes with data received from the first computer, the at least one write controller being further adapted to update at least one of the first plurality of logical volumes with data received from the second storage system over the at least one communication path.

Another illustrative embodiment of the present invention is directed to a first storage system for use in a computer system including a first computer, a second computer, a second storage system, and at least one communication path, wherein the first computer is coupled to the first storage system, wherein the second computer is coupled to the second storage system to permit the second computer to update a second set of data stored by the second storage system, and wherein the at least one communication path is coupled between the first and second storage systems to transfer data between the first and second storage systems, the at least one communication path not passing through the first computer. The first storage system includes: at least one storage device that stores a first set of data; and at least one write controller, coupled to the at least one storage device, to update at least one portion of the first set of data with data received both from the first computer and from the second storage system via the at least one communication path.

Another illustrative embodiment of the present invention is directed to a computer readable medium encoded with plurality of instruction for execution by at least one processor included in a first storage system. The first storage system being for use in a computer system including first and second computers and a second storage system, wherein the first storage system is to be coupled to the first computer to store data transferred from the first computer to the first storage system and the second storage system is to be coupled to the second computer to store data transferred from the second computer to the second storage system. The plurality of instructions, when executed by the at least one processor, cause the at least one processor to perform steps of: (A) updating a first logical volume of data stored on the first storage system with a first set of data transferred from the first computer to the first storage system; and (B) updating the first logical volume of data stored on the first storage system with a second set of data received from the second storage system, the second set of data being received via at least one communication path that does not pass through the first computer.

Another illustrative embodiment of the present invention is directed to a computer readable medium encoded with a plurality of instructions for execution by at least one processor included in a first storage system. The first storage system being for use in a computer system including first and second computers and a second storage system, wherein the first storage system is to be coupled to the first computer to store data transferred from the first computer to the first storage system and the second storage system is to be coupled to the second computer to store data transferred from the second computer to the second storage system. The plurality of instructions, when executed by the at least one processor, cause the at least one processor to perform steps of: (A) in response to a first logical volume of data stored on the first storage system being updated with a first set of data transferred from the first computer to the first storage system, causing the first set of data to be transmitted from the first storage system to the second storage system over at least one communication path that does not pass through either of the first and second computers; and (B) updating the first logical volume of data stored on the first storage system with a second set of data received from the second storage system, the second set of data being received via the at least one communication path.

DETAILED DESCRIPTION

As discussed above, in conventional systems wherein a Web site is implemented using multiple Web servers operating in parallel, data coherency between the multiple Web servers is maintained by transferring data through the Web servers and the network cloud. Applicants have discovered that maintaining data coherency in this manner consumes valuable processing time of the servers, thereby decreasing the efficiency of the servers in responding to user accesses. In addition, Applicants have also discovered that it is burdensome to require a system administrator to manually detect situations wherein database updates are desired, and to effect such updates. Finally, relying upon a system administrator to detect the need for updating the database copies can lead to a lag time in effecting such updates, resulting in the multiple copies of the database not being coherent for certain periods of time.

In accordance with one illustrative embodiment of the invention, coherency is maintained between a set of data (e.g., a database) used by multiple network servers (e.g., Web servers) by transmitting updates to the data set through a communication path that does not pass through the servers, thereby enabling the servers to be dedicated to responding to user accesses. In another illustrative embodiment of the invention, coherency between the data sets is maintained automatically, without requiring action by a system administrator.

Although several of the illustrative embodiments of the invention are described below in the context of Web sites implemented on Web servers, it should be appreciated that aspects of the present invention are not limited to use with Web servers, and may be employed with any computer system in which data coherency is to be maintained between two or more storage systems.

Figure 2:
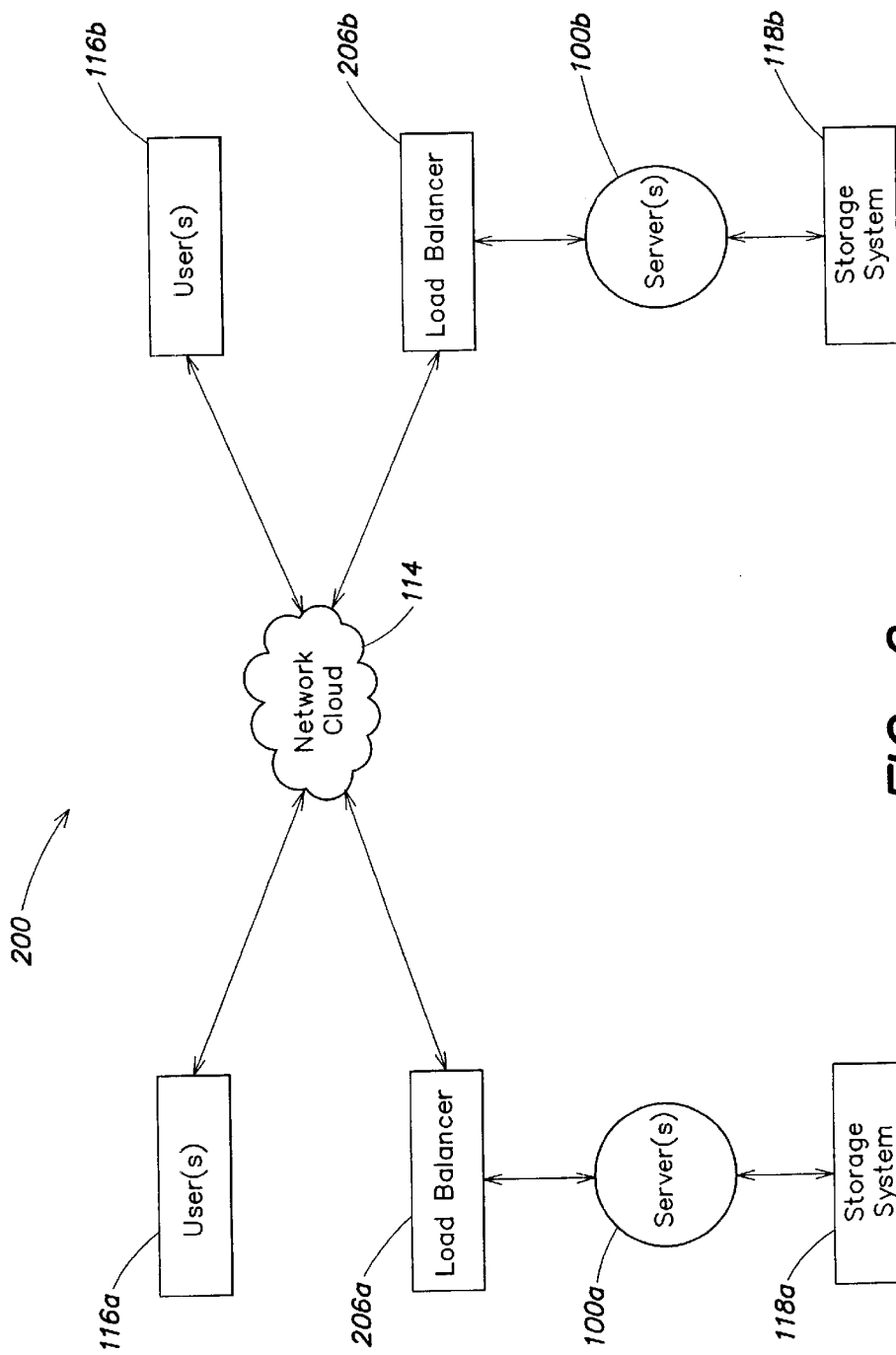
FIG. 2 is a block diagram of a prior art network system in which a Web site is implemented using multiple Web servers.

It should be appreciated that the communication path used to transmit data updates to maintain coherency between multiple copies of a data set in a multi-server environment can be implemented in any of numerous ways, and that the present invention is not limited to any particular implementation. In one embodiment of the present invention, data set coherency can be implemented automatically by the storage systems (e.g., storage systems 118a–b in FIG. 2) coupled to the network servers, so long as the storage systems are intelligent. For example, the storage systems may be implemented using the SYMMETRIX line of disk arrays, available from EMC Corporation, Hopkinton, Mass. The SYMMETRIX line of disk arrays supports a SYMMETRIX remote data facility (SRDF) that may be employed, in a manner described below, to maintain coherency between two or more SYMMETRIX disk arrays used to implement a multi-server system. SRDF is described in various publications available from EMC Corporation, including the SYMMETRIX Remote Data Facility Product Manual, P/N 200-999-554, rev. B, June, 1995. In addition, the SRDF is described in U.S. Pat. No. 5,544,347 (Yanai) which is hereby incorporated herein by reference in its entirety. It should be appreciated, however, that the present invention is not limited to the use of SRDF or to a system that employs SYMMETRIX disk arrays, and can be employed with any of numerous other types of storage systems.

Figure 3:
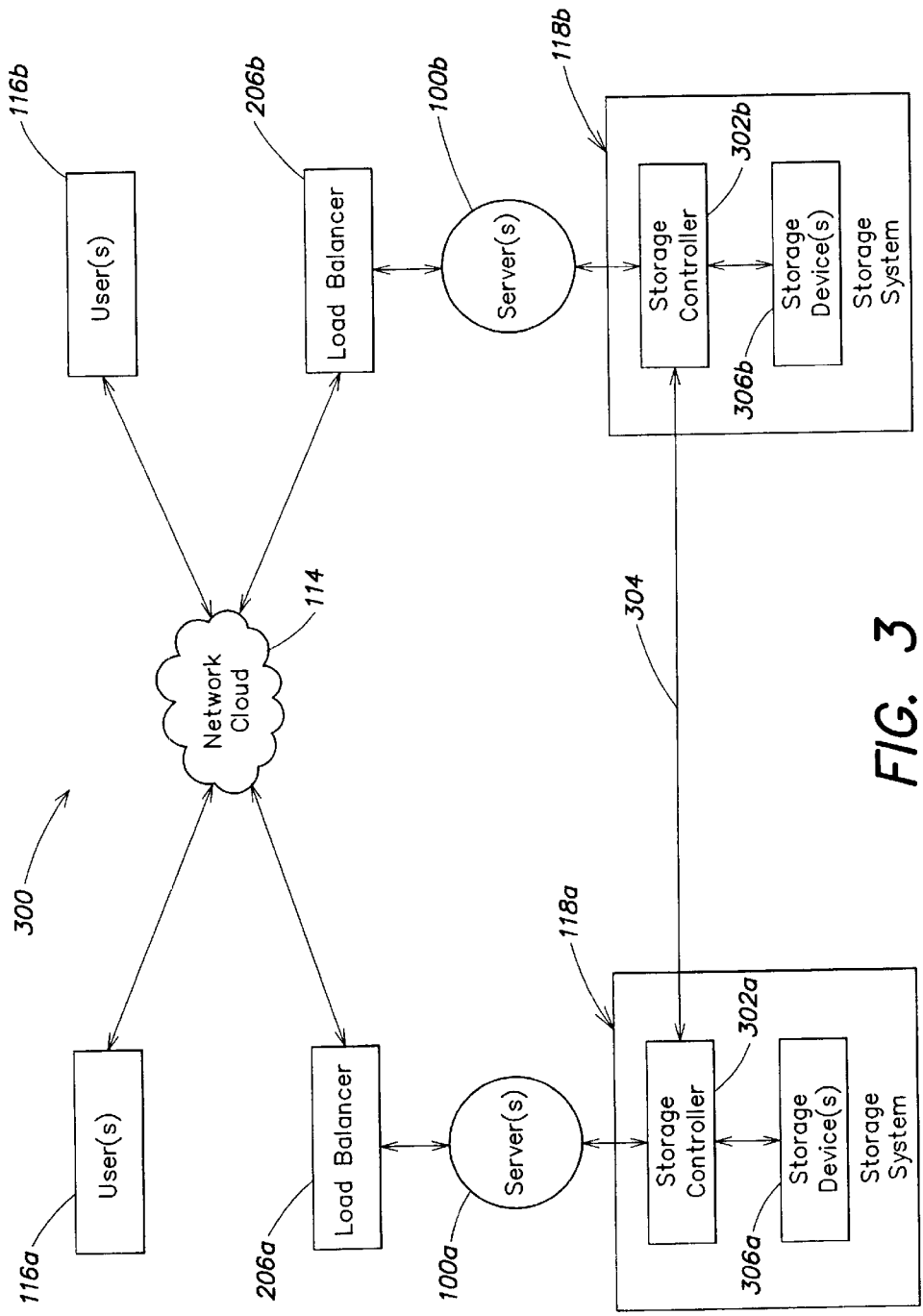
FIG. 3 is a block diagram of one illustrative embodiment of a network system in accordance with the present invention wherein a communication path that does not pass through the servers is provided between the storage systems coupled to the servers.

FIG. 3 illustrates a network system 300 which is configured in accordance with one aspect of the present invention. The system 300 includes a pair of Web servers 100a–b that implement a Web site and share a common database stored on storage systems 118a–b.

The specific characteristics of servers, Web sites, and Web servers may vary slightly depending upon the type of hardware and/or software used to implement them. The term server may, for example, refer to any computer program that provides services to other computer programs being executed by the same or different processors. The computer programs to which a server program provides services are commonly called client programs. The processor which executes a server program may also be referred to as a server, even though the processor may also execute additional non-server programs. A given application running on a processor may function both as a client of other server programs and as a server for different client programs.

The term Web site may, for example, refer to any collection of files that includes a beginning file called a home page. A home page file is defined by a unique address on the Internet, and a user can access the contents of the home page file (i.e., visit the Web site) using this unique address. Typically, a home page provides so-called links that permit a user to select other files associated with the home page (e.g., by clicking on associated link icons using a mouse). For example, a user can visit the Web site for EMC corporation using the unique address http://www.emc.com, and once the user has accessed the EMC home page, he or she can access a number of other files on the same or different servers using the links supplied thereby. The home page and related files of a Web site are generally coded using the Hypertext Markup Language (HTML), and are exchanged using the Hypertext Transport Protocol (HTTP). HTML defines a set of markup symbols or codes inserted in a file intended for display on a Web browser, i.e., a client program that requests HTML files from Web servers (described below). The markup symbols tell the Web browser how to display a Web page's words and images for the user. HTTP is an application protocol which defines a set of rules for exchanging files (e.g., text, graphic images, sound, video, and other multimedia files) on the World Wide Web.

The term Web server may, for example, refer to any computer program that serves requested HTML home pages or files to clients that have requested them. A single Web server may hold HTML home pages or files for multiple Web sites. Also, a single Web site may be distributed over multiple Web servers in the same or different geographic locations. A large Web site may, for example, include thousands of HTML files which are distributed among multiple Web servers located throughout the world.

In the network system of FIG. 3, the storage systems 118a–b respectively include storage devices 306a–b, and storage controllers 302a–b. Each of the storage devices 306a–b includes one or more physical devices, e.g., disks, on which data can be stored, and the storage controllers 302a–b respectively control the storage of data onto the storage devices 306a–b, respectfully.

In one embodiment, data stored on the storage devices 306a–b is presented to its corresponding server 100a–b in units called logical volumes, with the servers 100a–b writing data to or reading data from the storage systems 118a–b using a logical volume address. The term volume is used herein to identify separate physical devices controlled by one of the storage controllers 302a–b, or areas within a single physical device that are logically separate and identified by unique device addresses. Each physical storage device (e.g., a disk drive) in a storage system may correspond to a single logical volume. Alternatively, when the storage systems 118a–b is an intelligent storage system, the logical volumes may not map 1:1 to a physical storage device, such that each physical storage device may store two or more logical volumes or multiple storage devices may be used to store a single logical volume.

In accordance with one embodiment of the invention, the storage controllers 302a–b are coupled via a communication path 304 which does not pass through either of the Web servers 100a–b, and may be used to transfer data between the storage devices 306a–b to maintain coherency between the data sets stored thereon. Because data can be transferred between the storage systems 18a–b without passing through the either of the Web servers 100a–b, the Web servers 100a–b are not required to utilize processing resources to effect such data transfer operations, and are free to perform other tasks.

In one embodiment of the invention, each of the storage controllers 302a–b detects updates to the data set stored on the storage device 306 under its control, and automatically causes such data updates to be transferred to the other storage system 18 to maintain coherence between the data sets. Each storage controller 302 may cause the data updates to be transferred over the path 304 in response to any change being made to the one of the data sets stored on storage devices 306a–b. However, the invention is not limited in this respect, as the storage controllers 302a–b may instead cause data to be transferred between the storage systems 118a–b in response to any of numerous alternative criteria (e.g., the lapsing of a specified update time period). In addition, although it is advantageous to have the storage systems detect and transfer data updates automatically, the invention is not limited in this respect, as transfers over the path 304 may be initiated by the Web servers 100a–b or a system administrator.

As discussed above, the Web servers 100a–b share access to a common data set, such that each of the Web servers 100a–b may write to the same portion of the shared data set. To avoid contention between multiple writes to the shared data set by the Web servers 100a–b, in one embodiment of the present invention, a locking scheme is employed by which only one of the Web servers 100a–b may write to a particular portion of the shared data set at a time. Using such a locking scheme, either of the Web servers 100a–b may initiate a lock that prevents the other Web server from writing to a specified portion (e.g., one or more records) of the data set stored in its storage system 118.

In accordance with one embodiment of the invention, a Web server 100 that desires to execute a write to the shared data set first requests a lock for the specified portion of the data set to be written, and does not actually execute the write until it receives an indication that the lock has been established. After the lock has been established, the other Web server 100 is prevented from performing a write to the locked portion of the data set. The lock can remain in effect until the write operation is completed. A write operation may be considered to be complete, for example, when: (1) the data has been stored within the storage system 118 that is local to the writing Web server 100, (2) the data has been transferred (e.g., over path 304) from the local storage system 118 to the storage system 118 that is remote from writing Web server 100, and (3) the transferred data has been stored within the remote storage system 118.

A distributed locking mechanism such as that described above can be accomplished in any of a number of ways, and the invention is not limited to any particular implementation. One example of a locking technique which may be used in connection with embodiments of the present invention to temporarily prevent one of the servers 100 from accessing a portion of the data set stored on its storage system 118, is described in co-pending U.S. patent application Ser. No. 09/107,537, filed on Sep. 25, 1998, which is hereby incorporated herein by reference in its entirety.

In one embodiment of the invention, the storage systems 118a–b are located remotely from one another such that if one of the storage systems suffers from a major failure or is damaged, e.g., by an earthquake or fire, then the other storage system is unlikely to have been affected by the same cause of the failure or damage, and is therefore likely to retain an accurate copy of the data that was stored by the failed or damaged storage system.

Figure 1:
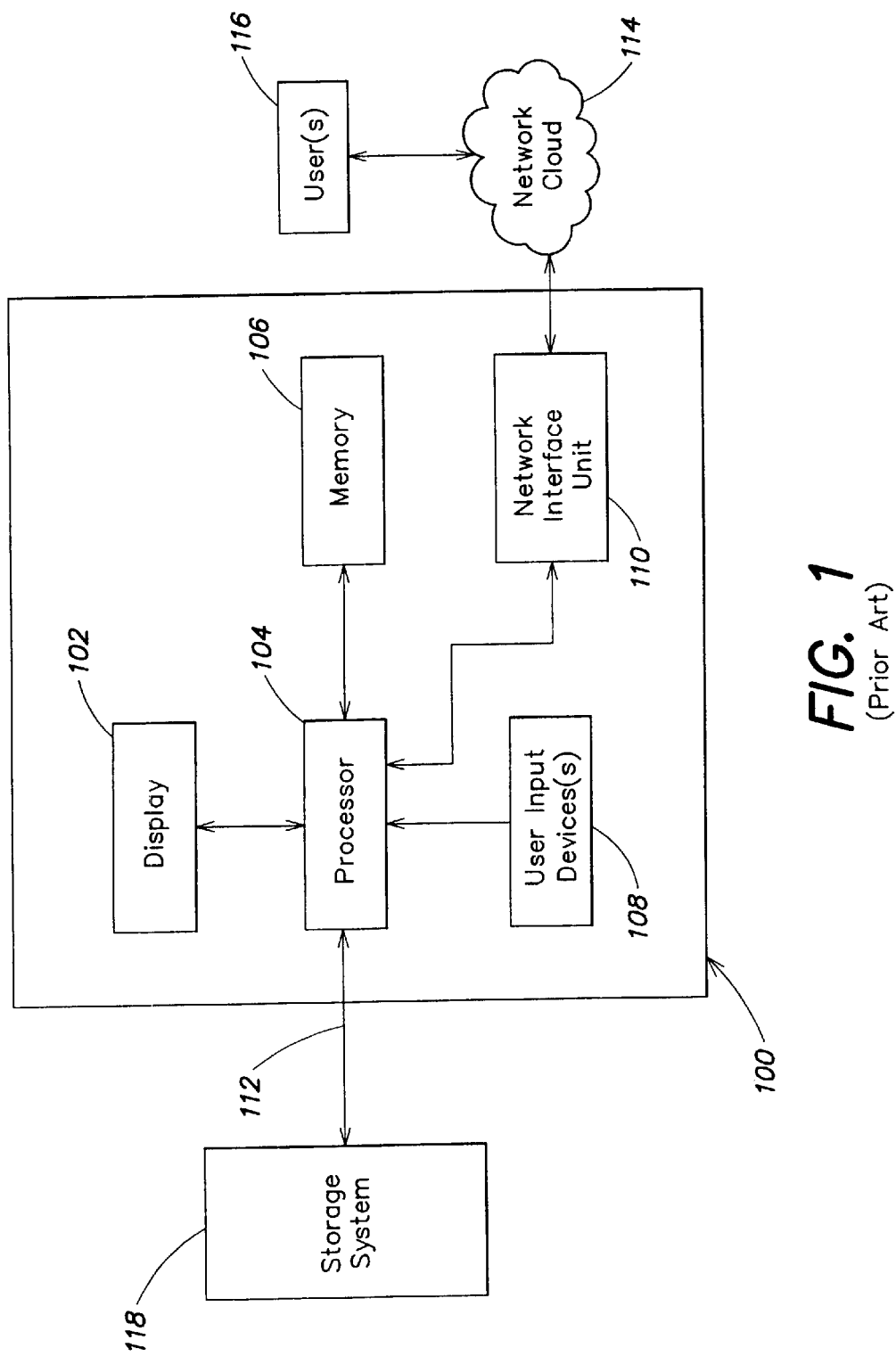
FIG. 1 is a block diagram of a conventional network server.

Each of the Web servers 100a–b in the system 300 can be configured in any of numerous ways, and the invention is not limited to any particular Web server configuration. For example, the Web servers 100a–b may be configured like the Web server 100 shown in FIG. 1, or in other configurations. Similarly, the load balancers 206a–b can be implemented in any of a number of ways, and the invention is not limited to any type of load balancing devices. In one embodiment, for example, the load balancers 206a–b are implemented using commercially available devices, such as CISCO Local Directors, CD-100 or CD-800 switches available from ArrowPoint Communications, Inc., based in Westford, Mass., or BIG/ip or 3DNS load balancers available from F5 Labs, Inc., based in Seattle, Wash.

As discussed above, one illustrative implementation for the network system of FIG. 3 is to implement the storage systems using the SYMMETRIX line of disk arrays, and to employ SRDF to implement the communication path 304 between the storage systems. As discussed in the above-referenced U.S. Pat. No. 5,544,347, a remote data facility may be operated in either a synchronous mode or an asynchronous mode. The primary difference between these modes of operation relates to the manner in which a command chain is received from the host computer (e.g., the Web servers 100a–b) are "committed" to their local storage systems. A chain is an operation between a host computer and a storage system wherein the host sees only a single status back for the operation. The host computer does not consider the operation to have been completed successfully until it receives an indication from the storage system that the command chain has been committed (i.e., processed successfully by the storage system). Each command chain may include one or more commands directed to a particular target volume, which is a unit of information that is mapped to one or more blocks of physical storage space on the storage system.

When operating in a synchronous mode, the host computer (e.g., Web server 100a) will not consider an operation specified by a command chain to be completed until the command chain has been committed to both the local storage system 118a and the remote storage system 118b. Thus, in synchronous mode, for a chain of commands that implements one or more writes, the local storage system will not provide an indication to its Web server that the chain of commands is committed until the data is successfully written in both storage systems. An example of a technique for implementing asynchronous operation in a remote data facility is described in U.S. patent application Ser. No. 09/053,420, entitled METHOD AND APPARATUS FOR ASYNCHRONOUSLY UPDATING A MIRROR OF A SOURCE DEVICE, filed Apr. 1, 1998, which is hereby incorporated herein by reference in its entirety.

The communication path 304 (FIG. 3) can be implemented in any of numerous ways, and the invention is not limited to any particular type of communication path. In one illustrative embodiment, for example, the communication path 304 is implemented using one or more conventional communication links (e.g., ESCON links) between the storage controllers 302a–b. In another illustrative embodiment, the communication path 304 includes interface units 608a–b (see FIGS. 6 and 7) to interface the storage controllers 302a–b with a commercially available communication channel 610, such as a T3 communication channel (described below). In further illustrative embodiments, the communication path 304 is implemented over the network cloud 114 that couples the Web servers, or over a wireless communication link (see FIG. 16). A detailed description of each of these alternative implementations of the communication path 304 is provided below.

Communication between the Web servers 100a–b and the storage controllers 302a–b, respectively, can be performed using any of a number of standard protocols, including, for example, SCSI, BUS and TAG (B&T), and ESCON. ESCON is a standard computer system interface and protocol developed by International Business Machines (IBM), and is described in detail, for example, in "ENTERPRISE SYSTEMS ARCHITECTURE/390-ESCON I/O INTERFACE", 3rd Edition (1992) published by IBM.

Figure 4:
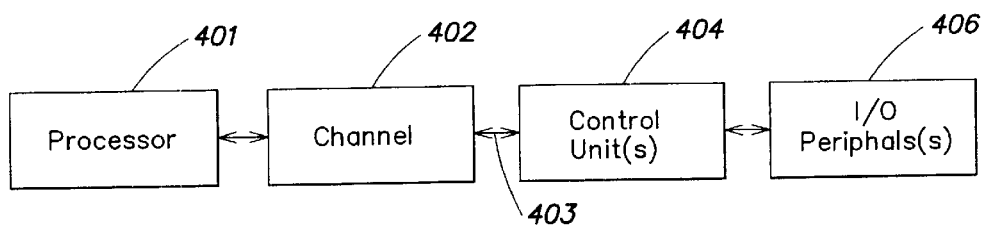
FIG. 4 is a block diagram of a conventional ESCON computer system environment.

ESCON is applicable to an environment such as the one shown in FIG. 4, in which a processor 401 is coupled to a channel 402 having direct access to a main memory (not shown) associated with the processor 401. The channel 402 provides input/output capability to the processor 401. More particularly, the channel 402 is coupled, over a link 403, to one or more control units 404, which each is in turn coupled to one or more I/O peripherals 406. Control unit 404 controls access to the processor 401, via channel 402, for each of the I/O peripherals 406, allowing each to have direct access to the main memory (not shown) of the processor 401. Dedicated ESCON links permit the control unit 404, along with its associated I/O peripheral(s) 406, to be disposed at a location somewhat remote (e.g., 60–80 km) from processor 401 and channel 402.

Figure 5:
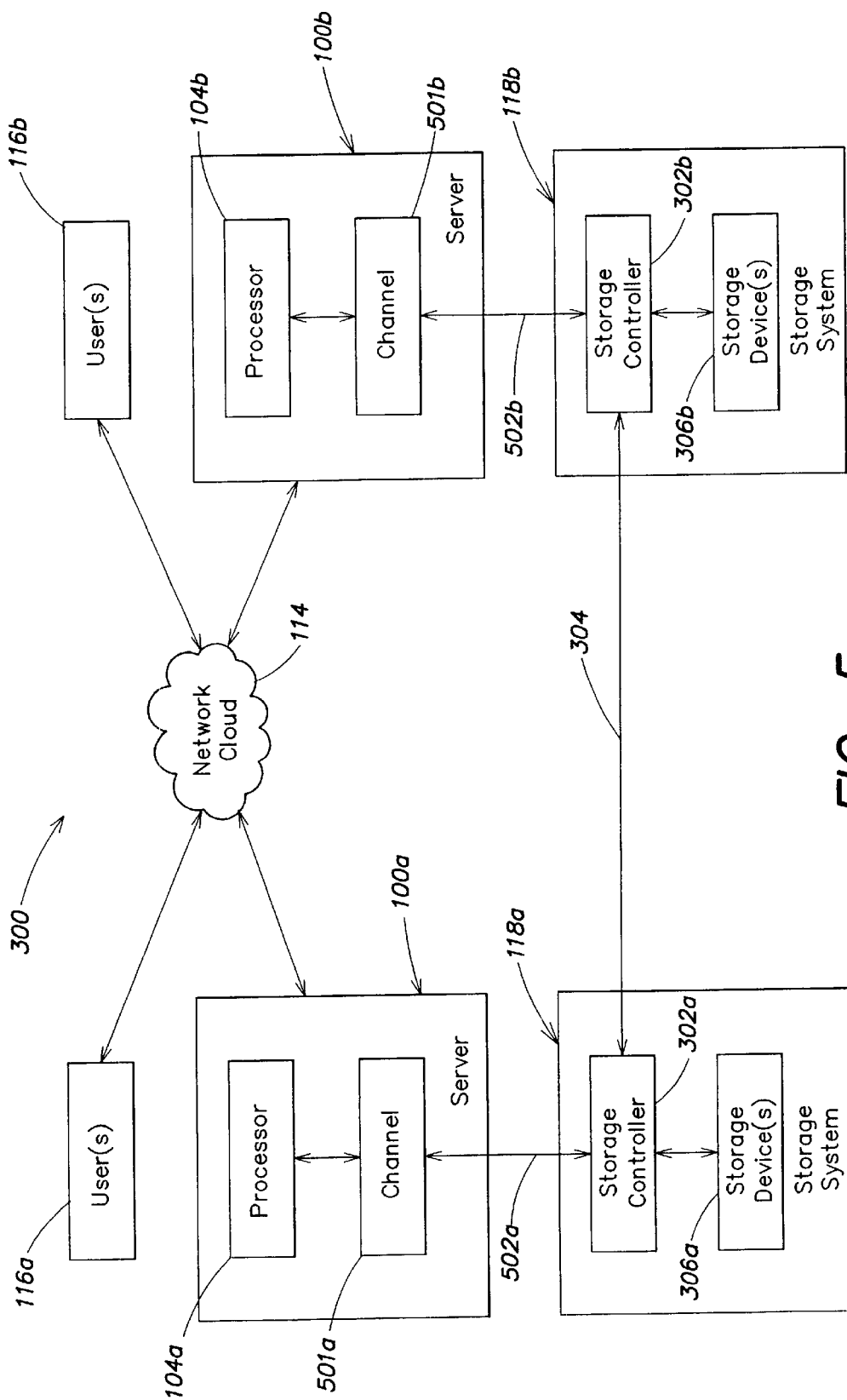
FIG. 5 is a block diagram of the FIG. 3 system in which a respective channel is coupled to each server's processor to establish the ESCON environment of FIG. 4 between each server and its corresponding storage system.

FIG. 5 shows an illustrative embodiment of the system 300 of FIG. 3, wherein the Web servers 100a–b respectively include processors 104a–b and channels 501a–b, which permit processors 104a–b, respectively, to communicate with the storage controllers 302a–b using the ESCON protocol. Each of the storage controllers 302a–b performs the role of a control unit 404 (FIG. 4), and each of the storage devices 306a–b performs the role of an I/O peripheral 406. Thus, the storage controllers 302a–b may be ESCON compatible devices that respectively communicate over links 502a–b with channels 501a–b of processors 104a–b using the ESCON protocol. Alternatively, the interface between the processors 104a–b and the storage controllers 302a–b may be implemented using any of a number of other protocols, such as SCSI or Bus and Tag (B&T).

Figure 6:
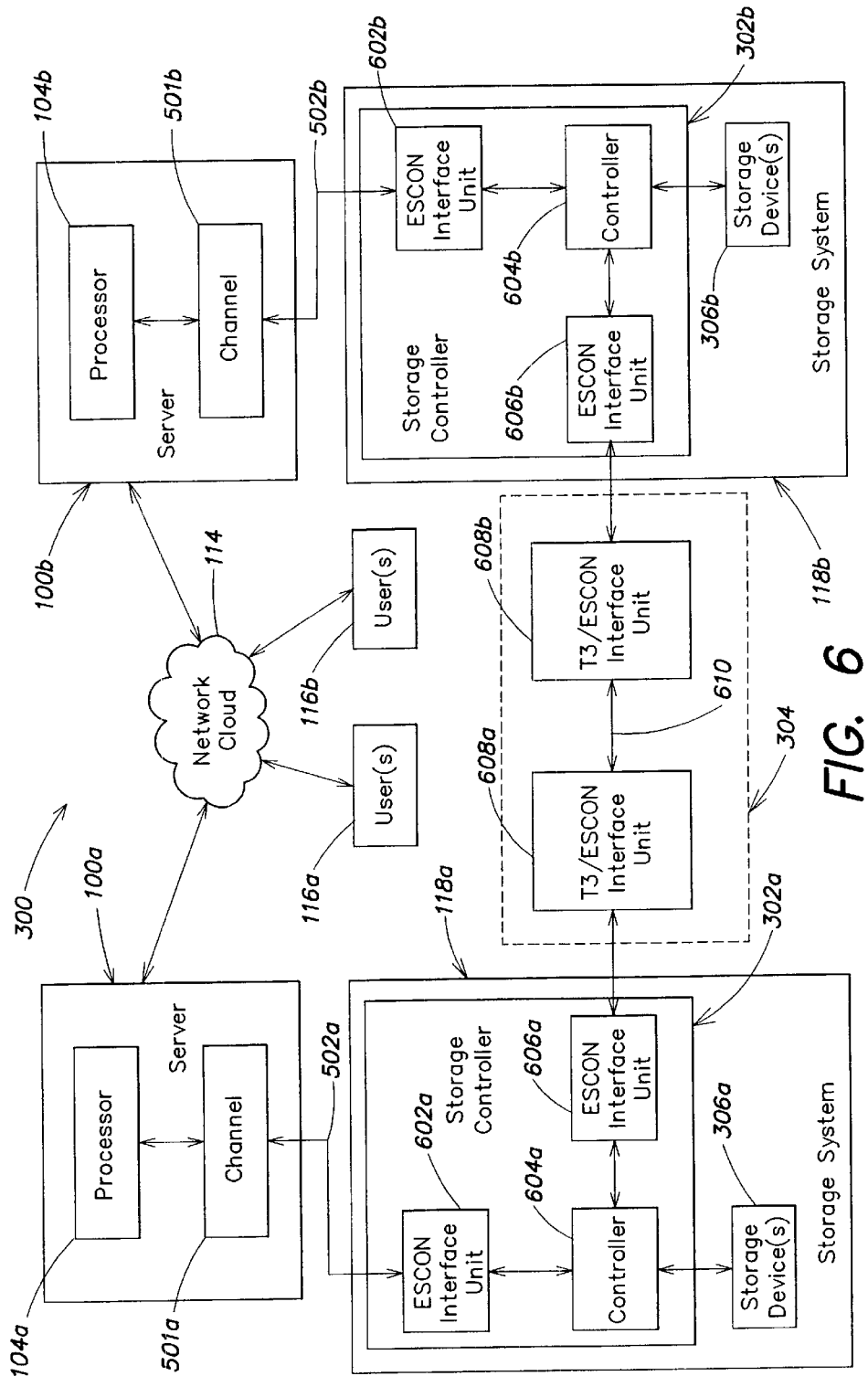
FIG. 6 is a block diagram of the FIG. 5 system in which ESCON interface units are provided to establish the communication path between the storage systems.

Example implementations of the storage controllers 302a–b are shown in FIG. 6. As shown, each of the storage controllers 302a–b may include a respective controller 604, and a respective ESCON interface unit 602 that interfaces the controller 604 with a channel 501 over a link 502. Together, each controller 604 and its associated ESCON interface unit 602 perform the functions of the control unit 404 (FIG. 4) in the ESCON environment, enabling communication between the processors 104a–b (FIG. 6) and the storage systems 118a–b (FIG. 6), respectively, using the ESCON protocol. Although each of the links 502a–b between the storage controllers 302a–b and their associated channels 501a–b is shown as a single path in FIG. 6, it should be understood each link 502 may include several (e.g., six–eight) parallel communication paths.

In one system implementation wherein the ESCON protocol is used for communication between the processors 104a–b and the storage controllers 302a–b, respectively, the ESCON protocol is also used (for reasons of simplicity) for communication between the storage controllers 302a–b. An example of such an implementation wherein the ESCON protocol is used for communication between the storage controllers 302a–b is shown in FIG. 6, wherein the storage controllers 302a–b are provided, respectively, with ESCON interface units 606a–b, and each of the ESCON interface units 606a–b is coupled to the communication path 304.

In embodiments of the invention wherein the ESCON protocol (or a modified version thereof) is used to transfer data from one of the storage devices 306a–b to the other, for any given data transfer, one of the storage controllers 302 acts as a so-called source or master, and the other storage controller 302 acts as a so-called target or slave.

In one embodiment of the invention, regardless of the direction in which data is being transferred between the storage systems 118a–b, one of the storage controllers 302a–b is permanently configured as the source and the other storage controller 302a–b is permanently configured as the target. For example, referring to FIG. 6, the storage controller 302a may be permanently configured as the source and the storage controller 302b may be permanently configured as the target for data transfers between the storage systems 118a–b. In such an example, for all data transfers between the storage systems 118a–b, the ESCON interface unit 606a and the controller 604a together perform the role of the channel 402 (FIG. 4) in the ESCON environment, the controller 604b and the ESCON interface unit 606b together perform the role of the control unit 404 (FIG. 4), and the storage device 306b serves the role of the I/O peripheral 406 (FIG. 4). In this configuration, all operations are controlled by the master. Thus, to perform a data transfer from the storage device 306a to the storage device 306b, the master storage controller 302a performs a write operation to the storage device 306b. To perform a data transfer from the storage device 306b to the storage device 306a in this configuration, the slave storage controller 302b requests the master storage controller 302a to perform a read operation from the storage device 306b.

In another embodiment of the invention, each of the storage controllers 302a–b is configured to act as either the source or the target, depending on which direction data is being transferred between the storage devices 306a–b over the communication path 304. In this embodiment, either storage system can control the transfer of data over the communication path 304.

In alternative embodiments of the invention, additional communication paths 304 and/or additional ESCON interface units 606 can be employed to provide additional communication paths between the storage controllers 302a–b. In one embodiment, for example, two ESCON interface units 606 are provided in each of the storage controllers 302a–b, and each of two communication paths 304 is coupled between a respective pair of the ESCON interface units 606 so that separate communication paths 304 can be dedicated to effecting data transfers in each direction between the storage controllers 302a–b.

In another alternative embodiment of the invention, which is illustrated in FIG. 6, a data communication channel 610 of the type leased by telephone service companies is used to implement the communication path 304 between the storage controllers 302a–b. Examples of such a data communication channel 610 include the family of T-carrier channels available in North America (e.g., T1, T3 and T5) and the family of CEPT communication channels available in Europe (e.g., CEPT-1 and CEPT-3). For the purpose of illustration, the communication channel 610 is discussed below as being implemented using a T3 channel. However, it should be understood that the present invention is not limited to use with any particular type of data communication channel.

T3 is a service provided by telephone service companies in which a subscriber pays a flat fee to lease exclusive use of a data communication channel between two locations. The T3 channel 610 employs existing telephone lines, satellite links, etc. to provide high speed data transmission between the two points requested by the subscriber within the public communication network. Other high speed data transports are available from providers for use over public communication networks. It should be apparent that by using the T3 channel 610 or some similar available service to implement the communication path 304 in a system such as the one shown in FIG. 6, the expense and time that would be incurred in implementing a conventional dedicated ESCON link between the storage controllers 302a–b is avoided. Furthermore, the limitation on the distance over which dedicated ESCON links can extend is overcome, enabling path 304 to be extended for significantly greater distances, thereby providing increased flexibility in implementing a user's desired configuration.

ESCON interface units 606a–b shown in FIG. 6 are independent of the particular transmission medium used to implement communication path 304. Therefore, depending upon the transmission medium used, it may be desirable to provide an additional interface unit 608 between each of the storage controllers 302 and the transmission medium, as discussed below. For the illustrative embodiment shown in FIG. 6 wherein the communication path 304 is implemented using the T3 line 610, T3/ESCON interface units 608a–b are provided to interface the storage controllers 302a–b, respectively, to the T3 line 610. A device for implementing the T3/ESCON interface units 608*a–b* is available from Data Switch Corporation, One Water View Drive, Shelton, Conn., and is sold under the model name 9800 MAX. This device is also capable of interfacing the storage controllers 302 with a T1 channel, as well has CEPT-1 and CEPT-3 channels.

As stated above, the present invention is not limited to any particular transmission medium. Thus, the particular type of interface unit 608 used to interface the storage controllers 302*a–b* to the communication channel 610 will vary depending on the transmission medium used for the application.

Figure 7:
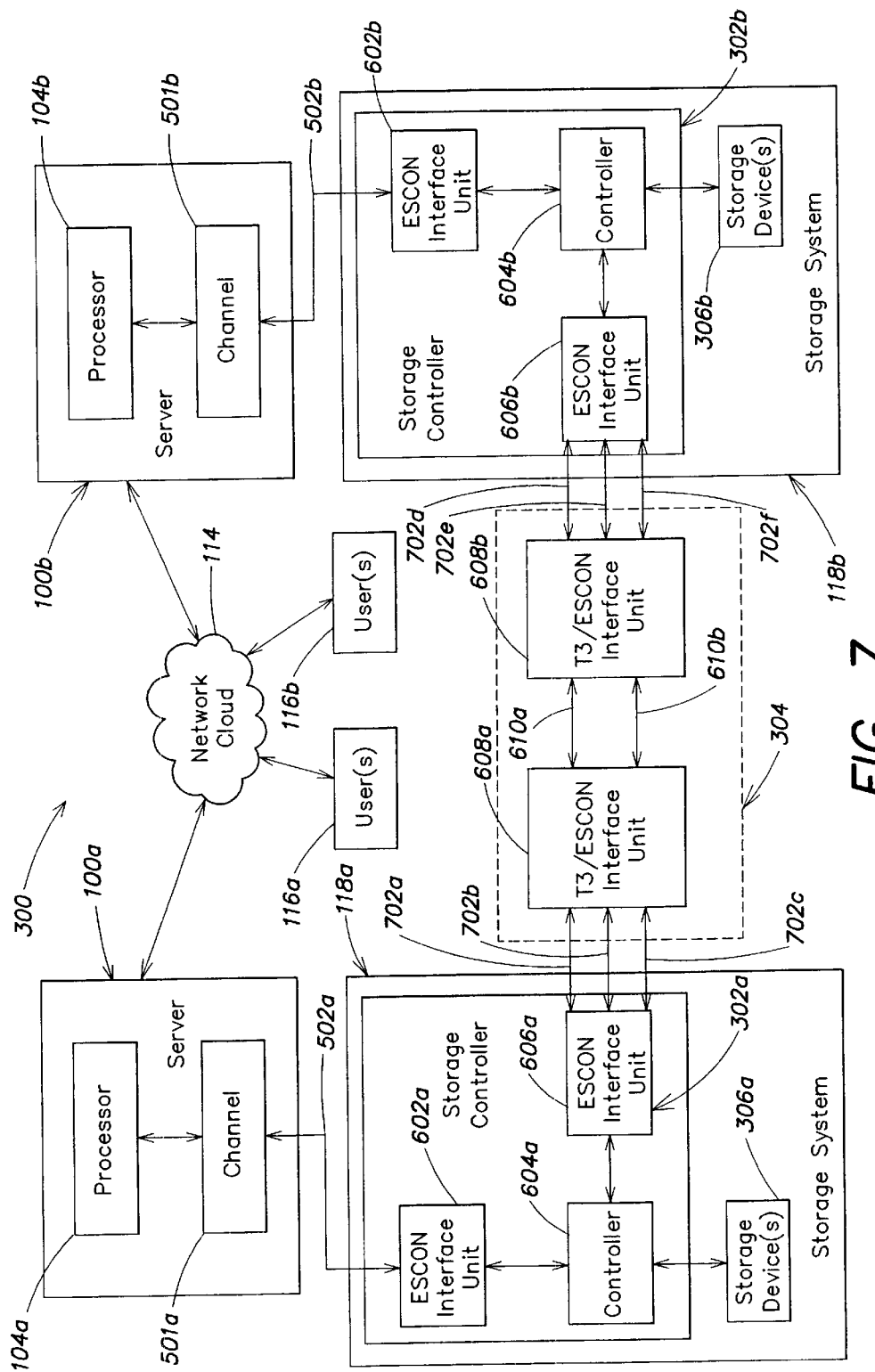
FIG. 7 is a block diagram of another illustrative embodiment of the network system of FIG. 3 in which multiple communication paths are used to establish the communication path between the storage systems.

Although the storage controllers 302*a–b* are shown in FIG. 6 as being coupled by a single communication channel 610, it should be understood that communication between the remotely disposed devices may be carried out over a number of parallel communication channels, such as channels 610*a–b* shown in FIG. 7. As mentioned above, the use of multiple communication paths 304 may permit one or more data transmission paths to be dedicated to data transmission in each direction between the storage controllers 302*a–b*. Additionally, multiple channels 610*a–b* maybe used for fault tolerance reasons to decrease the likelihood of the system 300 going down due a problem in a single communication channel 610, as well as to increase system bandwidth. Although two channels 610*a–b* are shown in FIG. 7, any number (e.g., one, two, three or four) of parallel communication channels may be provided between the storage controllers 302*a–b*.

In the FIG. 7 embodiment, multiple communication links 702*a–c* are provided between the ESCON interface unit 606*a* and the T3/ESCON interface unit 608*a*, and multiple communication links 702*d–f* are provided between ESCON interface unit 606*b* the T3/ESCON interface unit 608*b*. As shown in FIG. 7, the number of communication links between an ESCON interface unit 606*a–b* and its respective T3/ESCON interface unit 608*a–b* need not correspond identically to the number of communication channels 610 between the two T3/ESCON interface units 608*a–b*. Each T3/ESCON interface unit 608*a–b* may multiplex data, over the one or more communication channels 610*a–b*, received from its respective communication link (701*a–c* or 702*d–f*). The transmitted data is then demultiplexed on the receiving side of the data transmission. Thus, when the ESCON interface unit 606*a* is the transmitting unit, the data is multiplexed by the T3/ESCON Interface Unit 608*a* for transmission on communication channels 610*a–b* and is demultiplexed by T3/ESCON Interface Unit 608*b* for ESCON interface unit 606*b*, and vice versa. This multiplexing may be performed using commercially available multiplexing techniques (e.g., time division multiplexing (TDM)). Load balancing capability may also be provided in the T3/ESCON interface units 608*a–b*. For example, if three communication links 702*a–c* are provided between ESCON interface unit 606*a* and T3/ESCON interface unit 608*a*, and two communication channels 610*a–b* of differing bandwidths are provided between T3/ESCON interface units 608*a–b*, interface unit 608*a* may balance the loads transmitted over channels 610*a–b* to make the best use of available bandwidth, without spreading the load necessarily evenly among the communication channels 610*a–b*.

As will be appreciated from the discussion below, when data is transferred between devices using the ESCON protocol, information frames acknowledging receipt of the data and indicating the status of the operation are required by the protocol within a certain time period. This handshaking is used to ensure that transmitted data frames are not lost. When a dedicated ESCON communication link is provided between two remotely disposed devices, the propagation delay over the communication link may present problems in ensuring that acknowledgment frames will be received in the time periods required by ESCON. To address this problem, devices have been developed for interfacing two remotely disposed devices over a dedicated ESCON link. The interface devices have the capability of collecting and storing data, and of emulating the handshaking frames required between the channel 402 and control unit 404 (FIG. 4) to implement the ESCON protocol.

In one embodiment of the present invention, no portion of the communication path 304 disposed between the storage controllers 302*a–b* (including and interface units 608*a–b* and the communication channel 610) emulates the channel 402 or control unit 404 in the ESCON environment, or actively participates in the ESCON protocol in any way. Rather, the interface units 608*a–b* merely interface the storage controllers 302*a–b* to the particular communication medium used for the application.

In accordance with different embodiments of the invention, different protocols are provided for implementing the interface between two ESCON compatible devices (e.g., the storage controllers 302*a–b*) over a general purpose transmission medium (e.g., T3). As is explained in detail below, the ESCON compatible devices may communicate over the transmission medium using the standard ESCON protocol. Alternatively, the ESCON protocol may be modified to achieve improved performance.

The ESCON protocol supports a number of different operations between the channel 402 and control unit 404 (FIG. 4). An example of one such operation is discussed herein to illustrate the operation of devices using the ESCON protocol and the manner in which the protocol is modified in some embodiments of the invention to improve performance. However, it should be understood that the present invention is not limited to this single operation, and that each of the operations supported by ESCON is implemented in a similar fashion.

In ESCON, the transfer of data from processor 401 to control unit 404 (FIG. 4) is referred to as a write operation, and the transfer of data from the control unit 404 to the processor 401 is referred to as a read operation. Data is transferred using a maximum frame size that is negotiated by the channel 402 and control unit 404 during initialization. An example of a typical ESCON operation is a write operation of 64 k bytes of data from the processor 401 to the control unit 404 (FIG. 4). For purposes of the discussion below, it is assumed that the maximum frame size negotiated prior to execution of the command is 1 k bytes.

Figure 8:
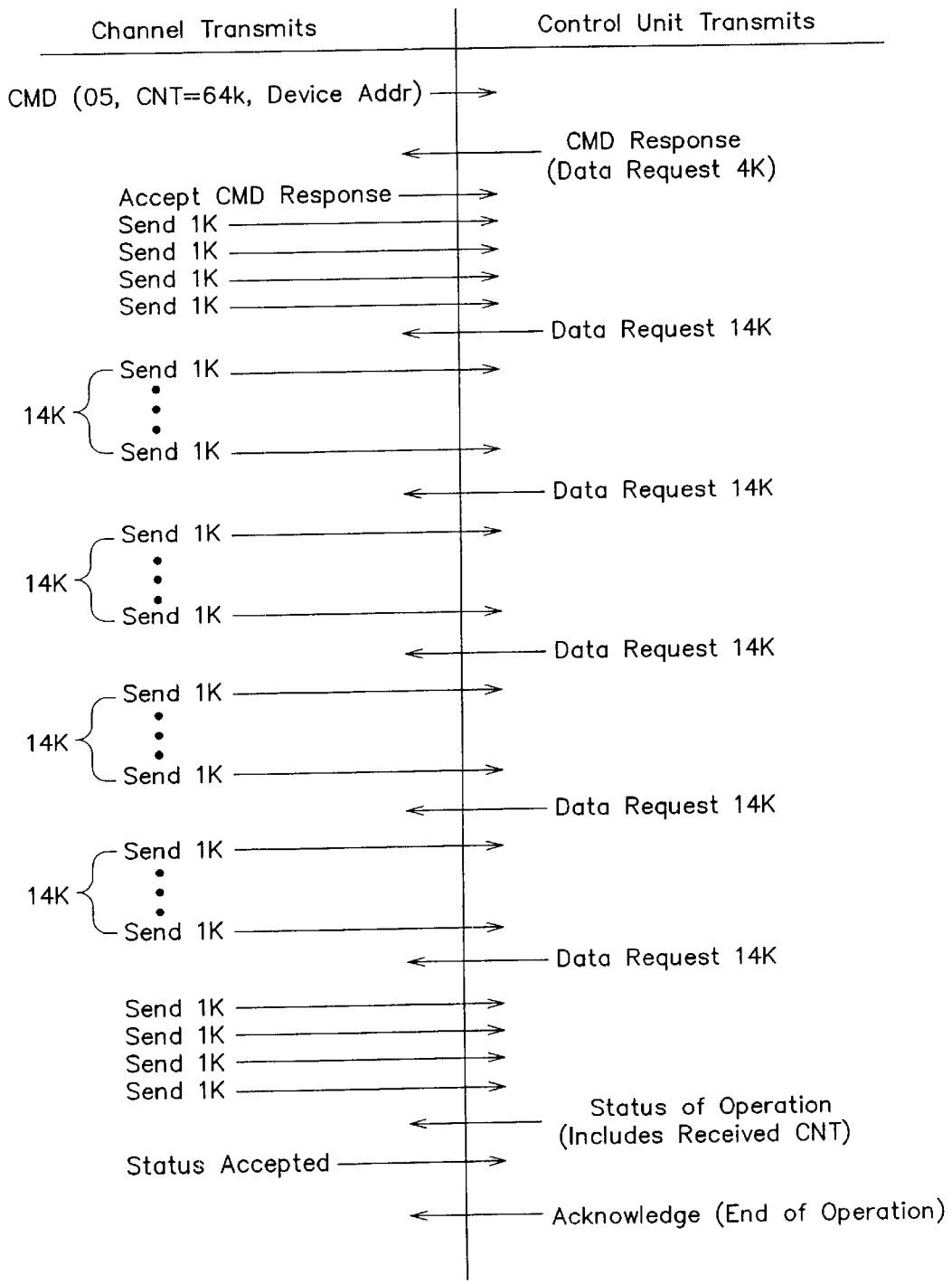
FIG. 8 illustrates a communication protocol for transmitting data between the storage systems.

FIG. 8 illustrates the handshaking that occurs between the channel 402 and control unit. 404 during the execution of the write 64 k byte operation. using the ESCON protocol. It should be understood that during read operations, the roles of the channel and the control unit in implementing the ESCON protocol are essentially reversed, such that each of the control unit and the channel has the capability of generating all of the handshaking frames required by the ESCON protocol.

Referring to the example of FIG. 8, a command frame is initially sent from the channel to the control unit specifying the operation to be performed. The command frame includes a command field including a code for the command to be executed, which is shown as "05" in the illustrative example of FIG. 8. For a write command such as this, a count (i.e., CNT) is provided specifying the number of bytes to be transferred, which is 64 k in the example shown. Finally, the address of the receiving device is specified to designate an I/O peripheral 406 (FIG. 4) to receive the data. When used to implement a system such as the one shown in FIG. 6 wherein only one control unit (e.g., ESCON interface unit 606*b*) and a single peripheral (e.g., storage device 306*b*) are coupled to the channel (e.g., ESCON interface unit 606*a*), the address necessarily designates the peripheral, and may specify a particular target location on the peripheral (e.g., a particular disk drive area in the storage device 306*b*).

Once the command frame is received, the control unit returns a command response frame indicating that the operation can begin. When the command is a write operation, the control unit also returns a data request specifying the number of bytes of data it initially has the capacity to receive. For example, the control unit may not have sufficient buffer storage to receive all of the data to be transferred by the operation, so that the control unit could not store all of the data if it was transferred at once. By specifying the amount of data it is capable of receiving, the control unit ensures that the channel does not transmit more data than the control unit can process, which might result in a loss of data. In the example shown in FIG. 8, the initial data request specifies that the control unit can initially receive 4 k bytes of data.

Once the command response and data request are received by the channel, the channel transmits an accept command response frame to the control unit along with the requested 4 k bytes of data, which are transmitted in separate frames of 1 k bytes each as specified by the negotiated maximum frame size. Once the last of the 4 k frames is received by the control unit, the control unit transmits a second data request, requesting the amount of data that it has the capacity to receive at that time, specified as 14 k bytes of data in the example shown in FIG. 8. The channel responds to receipt of the data request by transferring the requested 14 k bytes of data in fourteen separate frames of 1 k bytes each. In this manner, through the issuance of separate data requests, the control unit controls the pacing of the data frames transmitted from the channel during the write operation, ensuring that the control unit has the capacity to process each received data frame so that none is lost.

In the example shown in FIG. 8, the last data request issued by the control unit requests 4 k bytes of data. After the last frame of 1 k bytes is received by the control unit, the control unit transmits to the channel a status of operation frame, which includes information indicating the number of data frames received by the control unit. The channel checks the received count specified in the status of operation frame to ensure that it equals 64 k, indicating that no data frames were lost. After the status of operation frame is checked by the channel, the channel returns a frame indicating that the status was accepted. Finally, after the status accepted frame is received by the control unit, the control unit returns an acknowledge frame to the channel which ends the operation.

As should be appreciated from an examination of FIG. 8, the ESCON protocol requires a significant amount of handshaking between the channel and control unit. A number of command frames, data requests, status indications, acceptance frames and the acknowledge frame (collectively "transactions") are transmitted in addition to the data frames, thereby decreasing the performance of the system when executing the operation. As should be appreciated, the magnitude of the performance degradation due to this handshaking varies depending upon the propagation delay through the transmission medium between the channel and control unit. Thus, as the distance between the channel and control unit is increased, the propagation delay through the transmission medium also increases, resulting in a significant increase in the percentage of the total operation time attributable to the transactions.

As seen from the foregoing, as the propagation delay through the transmission medium increases, performance degradation of the operation due to the transactions employed by the ESCON protocol greatly increases. Therefore, in a number of alternate embodiments of the present invention, communication between ESCON compatible devices over a general purpose communication channel (e.g., T3) is performed using specially-developed protocols. These protocols are similar in some respects to ESCON. However, in these alternate embodiments of the invention, the ESCON protocol has been modified to reduce the number of transactions between the channel and control unit, thereby increasing performance.

Figure 9:
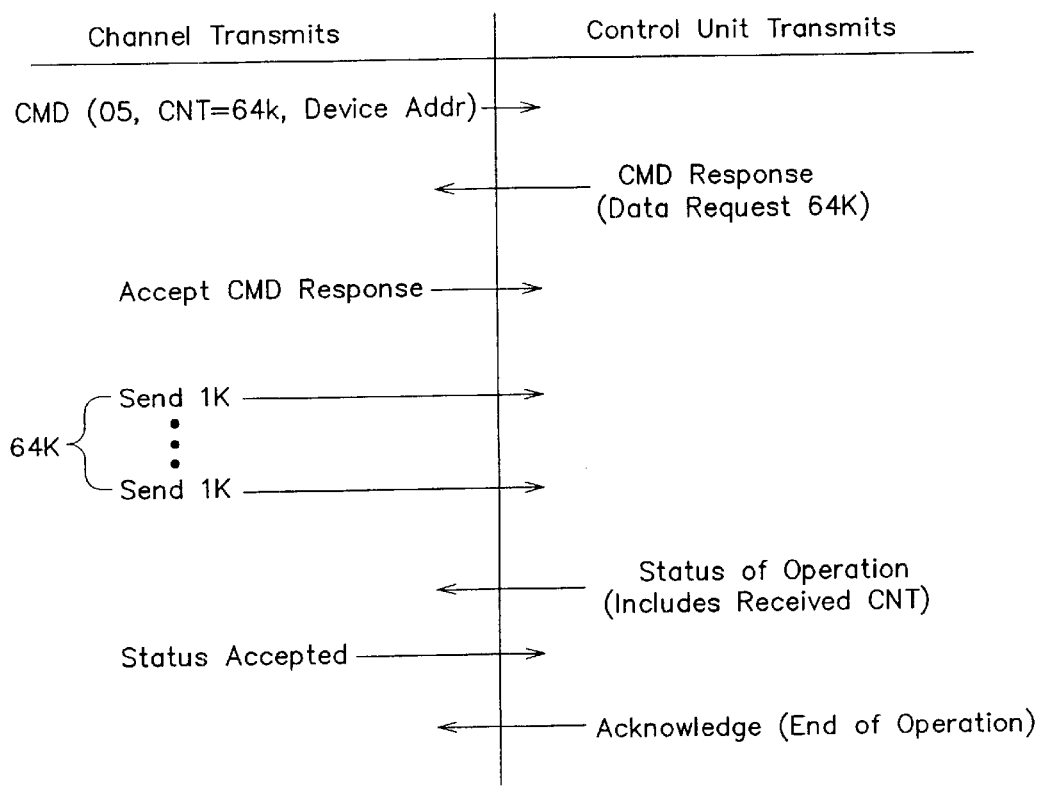
FIG. 9 illustrates an alternate communication protocol for transmitting data between the storage systems.

In one embodiment of the invention illustrated in FIG. 9, a modified protocol is employed wherein data requests are not limited to the current capacity of the control unit. Rather, when a write command frame is received from the channel, the control unit simply requests that all of the data frames for the operation (e.g., 64 k bytes in the example of FIG. 9) be transferred in a single data transmission. As used herein, the reference to a single data transmission indicates that the transmitted information (e.g., data frames, command frames, acknowledgment frames or status frames) is transmitted as a block that requires only one propagation delay through the transmission medium between the channel and the control unit. There may be gaps in the transmitted frames, but since the transmission of each frame in the block is not dependent upon the receipt of any frame from the receiving device (i.e., channel or control unit), any gap in the block of frames transmitted in a single data transmission is less than, and independent of, the propagation delay through the transmission medium. It should be immediately apparent that the modified protocol of FIG. 9 provides for improved performance in relation to the embodiment of FIG. 8 through the reduction in the number of transactions and separate data transmissions required.

It should be appreciated that the increased performance achieved by the protocol of FIG. 9 results from modifying the ESCON protocol so that the receiving device (i.e., the control unit for the write operation of FIG. 9) does not maintain control over the pacing of the data transfer, but rather, simply requests that all the data for the operation be transferred at once. In a conventional system wherein a dedicated ESCON link is provided between a channel and control unit, the protocol of FIG. 9 may have resulted in significant errors and data frame loss. For example, if the control unit in the example of FIG. 9 has buffers capable of storing only 14 k bytes, the receipt of any number of data frames in excess of 14 k bytes at a rate exceeding that at which the control unit can process received data frames would result in lost frames. A conventional dedicated ESCON link is capable of transferring data frames at a rate of approximately twenty megabytes/sec. Thus, if the control unit cannot process received frames at that rate, data frames would frequently be lost if the protocol of FIG. 9 was used in a conventional ESCON system. Since the ESCON protocol is typically used to handle communication between a processor 401 and a control unit 404 as shown in FIG. 4, the loss of data frames could be a serious error, resulting in interruption of the processor 401.

As seen from the foregoing, the protocol shown in FIG. 9 may not be suitable for all ESCON applications. However, this protocol is suitable for an application, such as the one shown in FIG. 6, wherein the rate of transmission over the communication channel 610 between two ESCON compatible devices is less than or equal to the rate at which the ESCON compatible devices can process received data frames. For example, a T3 data line transfers data at a rate of approximately 4.4 megabytes/sec. A storage controller such as the controllers 604a–b in FIG. 6 can typically process received data frames at a significantly faster rate (e.g., 15–20 megabytes/sec). Therefore, in the embodiment of FIG. 6, when data is transferred from either one of the storage controllers 302a–b to the other, a data request for the entire amount of data for the operation can be issued without a significant risk that data will be lost, because the receiving storage controller 302 can process the received data frames at a rate that exceeds that at which the communication medium can transfer them.

Although the risk of data frame loss may be small when the protocol of FIG. 9 is used in an application wherein the coupled devices can process received data frames at a rate that exceeds the transmission rate of the communication link, the removal of the ability of the receiving device to pace the data transfer (as illustrated in FIG. 8) may occasionally result in some data frames being lost when the receiving device is busy and cannot process received frames at its maximum rate. However, in a system such as the one shown in FIG. 6, the loss of data frames between the storage controllers 302a–b is not as significant an error as when data is lost when transferred from one of the host processors 104 to its associated storage system 118. Particularly, the lost data may simply be retransmitted between the storage controllers 302a–b, without interrupting operation of the processors 104. Thus, although some data frames may be occasionally lost using the protocol of FIG. 9, the penalty incurred to recover from such an error may be relatively insignificant for some applications, and may be outweighed by the performance gains provided by this protocol.

Error checking and recovery is conventionally performed in one of two ways. When a large block of data is transferred (e.g., 64 k bytes in the examples above), error checking and recovery may be done solely on the block level, such that if an error occurs in any of the transmitted bytes of data in the block, the entire block is re-transmitted. This type of error checking is generally employed with a very reliable transmission medium through which errors are infrequent. Alternatively, error checking and retransmission may be performed on a lower level (e.g., the 1 k byte frames discussed in the example above). Thus, if the transmission medium is relatively unreliable so that more frequent errors occur, only a smaller frame of data need be re-transmitted to recover from the error, so that a large performance penalty is not incurred in re-transmitting the entire block.

Dedicated ESCON links are very reliable, so that error checking and recovery is generally not performed at a low level on those links. However, the present invention is capable of being performed using many different types of transmission media, some of which (e.g., T3) may be less reliable than a dedicated ESCON link. Therefore, in accordance with one embodiment of the invention, the ESCON interface units 608a–b (FIG. 6) perform error checking and recovery at a lower level than the blocks of data transferred by the ESCON commands, so that when errors occur, a significant performance penalty is not incurred in re-transmitting the entire block of data.

Figure 10:
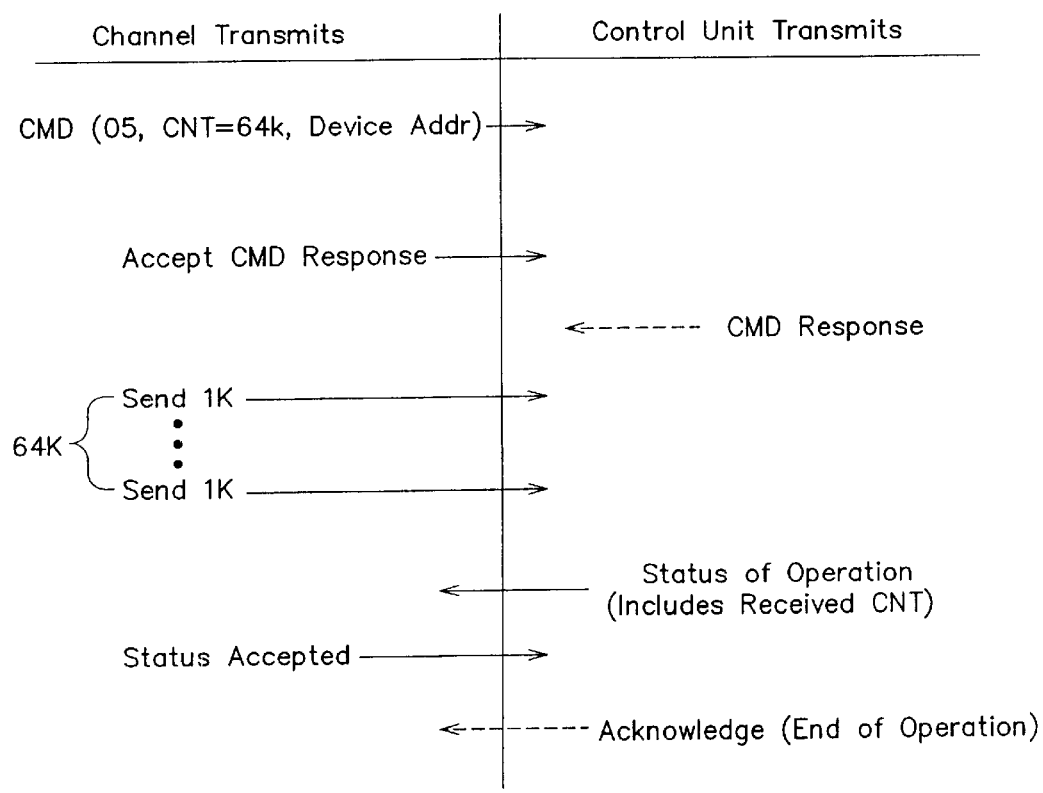
FIG. 10 illustrates a further alternate protocol for transmitting data between the storage systems.

An additional alternate protocol is shown in FIG. 10, wherein the number of transactions is further reduced from the embodiment shown in FIG. 9. In FIG. 10, the channel (e.g., the ESCON interface unit 606a) transfers the accept command response frame and all of the data along with the command frame in a single transmission, without waiting for the command response frame to be returned from the control unit (e.g., the ESCON interface unit 606b). In this manner, two propagation delays through the transmission medium are saved, so that no performance penalty is incurred waiting for the command frame to be transmitted from the channel to the control unit, and for the command response frame to be transmitted back to the channel. The control unit may still return the command response in this embodiment. However, as discussed below, the channel need not check to verify that the command response was returned, as this handshaking is unnecessary. This is indicated in FIG. 10 by the transmission of the command response being represented as a dotted line. Since the command response frame is unnecessary, in an alternate embodiment of the invention this frame is not returned in response to receipt of a command.

In the network system 300 shown in FIG. 6, only two storage controllers 302a–b are connected together over the communication path 304. Therefore, the ESCON compatible device that transmits a command frame (e.g., ESCON interface unit 606a that acts as the channel in the embodiment of FIG. 6) in this system is assured that the receiving device is the intended recipient (e.g., ESCON interface unit 606b that acts as the control unit). Thus, when an operation is performed between the two ESCON compatible devices over the communication path 304 using the protocol of FIG. 10, the device that initiates the operation transmits the command frame, the accept command response frame and the data in one transmission, and then simply assumes that it will be received and processed by the receiving device. If the control unit is not ready to receive data sent by the channel, the data will simply be discarded. Furthermore, if the command (i.e., the command frame and any data associated therewith) is not received or processed properly, the transmitting device will be notified via the information contained in the status of operation frame, or by the non-receipt of the status of operation frame, prompting retransmission of the command. Thus, the command response frame is not necessary and may be eliminated in the embodiment of FIG. 10.

Another difference between the protocols of FIGS. 9 and 10 is that although the acknowledge frame is sent by the control unit in FIG. 10, the channel does not wait to receive the acknowledge frame before beginning the next operation. This is indicated in FIG. 10 by the transmission of the acknowledged frame being represented as a dotted line. Thus, although the status accepted and acknowledge frames are transmitted, a savings of two propagation delays is achieved as compared with the protocol shown in FIG. 9, because after the status accepted frame is transmitted, the channel begins the next operation without waiting for the status accepted frame to arrive at the control unit and then for the acknowledge frame to be returned to the channel.

If an error occurs in an operation that results in the transmitting device (e.g., the channel in FIG. 10) not transmitting the status accepted frame, the receiving device (e.g., the control unit in FIG. 10) will not return the acknowledge frame and will continue to wait for the status accepted frame. In accordance with the embodiment of FIG. 10, if the transmitting device proceeds to a next operation and transmits a new command to the receiving device, the receiving device will report an error associated with the preceding command due to the failure to receive the status accepted frame. Thus, the error will eventually be detected upon the attempt to execute the next command. Therefore, the transmitting device need not await receipt of the command response as discussed above, and need not await receipt of the acknowledge frame before beginning the next operation.

As seen from the foregoing, performance improvements can be achieved by modifying the ESCON protocol to reduce the handshaking required. To understand the purpose for each of the handshaking signals in ESCON, which was developed as a general purpose protocol, the standard should be reviewed in detail. However, as should be appreciated from the foregoing for a number of applications such as those described above, not all of the handshaking signals required by ESCON are necessary, and some may be eliminated to achieve improved performance.

It should be recognized that by removing some of the handshaking levels from the ESCON protocol, error detection may occur less frequently, resulting in potentially greater recovery penalties when an error is detected. The ESCON protocol provides for a fairly sophisticated error recovery system. However, in accordance with the protocols shown in FIGS. 8–10, a far simpler technique is employed. Whenever an error is detected at any stage of a command, the command is simply re-executed from the beginning.

In alternate protocols shown in FIGS. 9 and 10, the status accepted and acknowledge frames are eliminated when two consecutively transferred commands are directed to the same target address (e.g., to the same disk drive in the storage device 306b). When commands are chained in this manner, the receipt of a second command directed to the same target address indicates that the status of operation frame for the preceding command was received at the transmitting device (e.g., the channel in the example of FIGS. 9 and 10). Thus, transmission of the status accepted and acknowledge frames is unnecessary. Thus, for a chain of consecutively transmitted commands directed to the same target address, status accepted and acknowledge frames are sent only for the last command in the chain.

Figure 11:
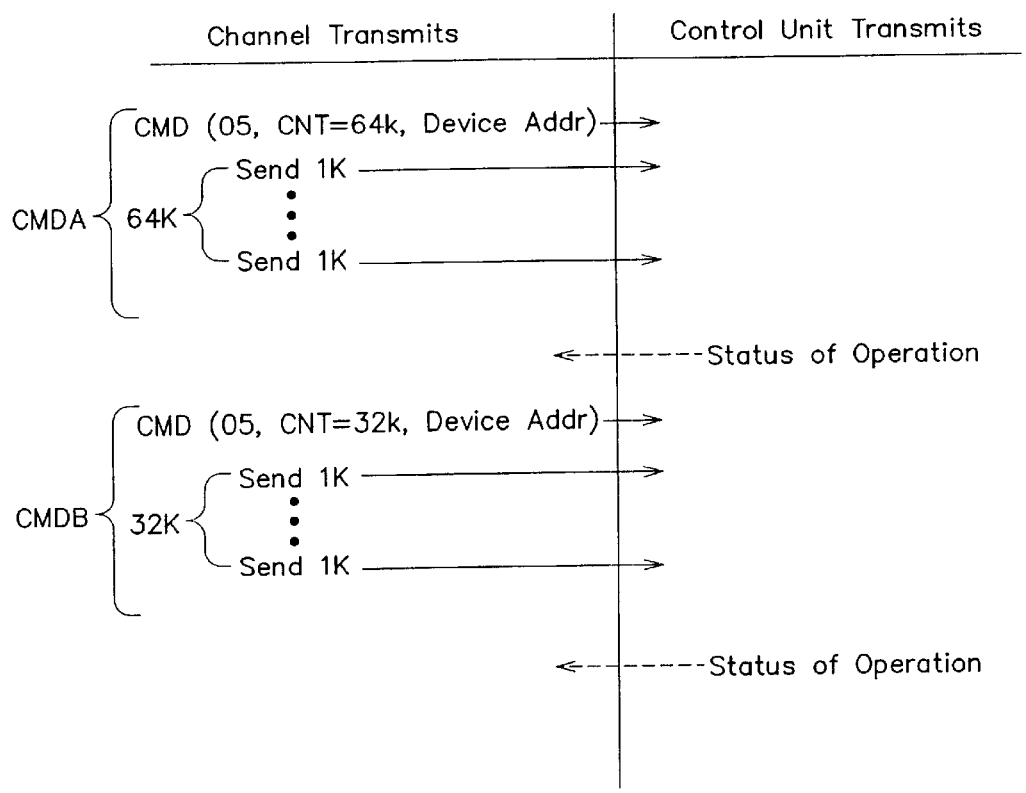
FIG. 11 illustrates an additional alternate protocol for transmitting data between the storage systems.

In an additional alternate protocol shown in FIG. 11, the number of transactions is further reduced from the embodiment shown in FIG. 10. As discussed above in connection with FIG. 10, the command response frame need not be returned from the receiving device because it is unnecessary. Therefore, as shown in the protocol of FIG. 11, both the command response and accept command response frames are eliminated. Alternatively, these frames could still be sent by the receiving and transmitting devices respectively, but need not be checked.

Similarly, it has been found that the transmission and checking of the status accepted and acknowledge frames is not necessary for the vast majority of commands that execute without error. Therefore, in the protocol of FIG. 11, the transmission of the status accepted and acknowledge frames has been eliminated, with the sole exception that the status accepted frame is employed in one embodiment of the present invention in an error handling routine discussed below.

In ESCON and the other protocols described above, the status accepted frame indicates that the status of operation frame has been received, for example by the control unit in the examples discussed above. The acknowledge frame confirms that the device that sent the status accepted frame is aware that it was received by the other, and indicates that the operation over the link has completed. The acknowledge frame includes information indicating that the device sending the acknowledge frame (the control unit in the examples discussed above) is disconnecting from the link, so that operations between the channel and a different control unit may be initiated.

In the embodiment of the present invention wherein only a single control unit is associated with the channel (e.g., ESCON interface unit 606b of FIG. 6), the control unit need not be disconnected from the link at the completion of an operation. Receipt of the status of operation frame indicating that the operation was processed successfully at the receiving device is sufficient to indicate that the operation has been successfully completed. Therefore, although the status accepted and acknowledge frames are employed in some embodiments of the invention because they provide an additional level of confidence that both the channel and the control unit have completed the operation, they are not necessary. In the protocol of FIG. 11, rather than employing a number of handshaking steps to ensure that an operation and its status checking are progressing successfully, an assumption is made when the operation is begun that it will complete successfully. If it is discovered at the end of the operation that an error occurred, the operation is re-executed in accordance with an error recovery routine discussed below.

The number of transactions is further reduced in the protocol of FIG. 11 because the transmitting device (i.e., the channel for the illustrative commands shown) does not wait for the receipt of the status of operation frame before moving to execution of the next command. Rather, the handshaking between the channel and control unit relating to the sending of the status of operation frame is performed later, simultaneously with the execution of additional commands involving the transfer of data between the channel and the control unit over the link. This is represented in FIG. 11 by the transmission of the status of operation frame being represented in dotted lines.

When multiple commands (including a command frame and any associated data) are executed consecutively (e.g., commands CMDA and CMDB in FIG. 11), the protocol of FIG. 11 provides a performance improvement over that of FIG. 10 because no performance penalty is incurred waiting for the status of operation frame to be received at the transmitting device before beginning execution of the next operation. Thus, the consecutively executed commands may be transferred in a single data transmission requiring only one propagation delay through the transmission medium for each group of consecutively executed instructions. As used herein, the reference to a single data transmission for multiple commands indicates that the commands are transmitted as a block that requires only one propagation delay through the transmission medium between the channel and the control unit. There may be gaps between the commands or frames within one of the commands, but since the transmission of each frame in the block is not dependent upon the receipt of any frame from the receiving device (i.e., channel or control unit), any gap in the block of commands transmitted in a single data transmission is less than, and independent of, the propagation delay through the transmission medium.

With the protocol of FIG. 11, the larger the number of commands in the group, the lower the average propagation delay per command. If the group of consecutively executed commands is large enough to maintain an interrupted flow of commands and data through the transmission medium without any gaps between consecutively executed instructions, the average propagation delay per command can be reduced to effectively zero.

The protocol of FIG. 11 is well-suited to use with a transmission medium that is not only bidirectional, but also full-duplex so that the status of operation frame may be transmitted from the receiving device (e.g., the control unit in FIG. 11) to the transmitting device (e.g., the channel in FIG. 11) at the same time that additional commands and data are being transmitted over the link. Thus, for each group of commands that is executed consecutively in a single data transmission, only one propagation delay is incurred for the entire group.

Referring to the illustrative system configuration shown in FIG. 7, it should be understood that generally only one input/output operation (e.g., a transfer of data from the storage controller 302a to the storage controller 302b, or vice versa) can be executed at a time over each of communication channels 610a–b between the storage controllers 302a–b. However, by allowing a number of commands that implement input/output operations to be "open" (i.e., begun by transmission of the command but not yet completed by receipt of the status of operation frame) simultaneously, the protocol of FIG. 11 enables multiple virtual links to be established over each of communication channels 610a–b between the storage controllers 302a–b.

In one embodiment of the invention, the protocol shown in FIG. 11 is implemented by providing two entities in each of the storage controllers 302a–b. One entity controls the command currently being transmitted between the channel and control unit, and the other (referred to hereafter as the status checking entity) completes the handshaking and error checking with respect to other open commands previously transmitted over the link but not yet completed by the receipt of the status of operation frame. In the illustrative system shown in FIG. 7, both of these entities are implemented in each of the controllers 604a–b via a programmed processor or by dedicated hardware as discussed below.

Using the protocol shown in FIG. 11, the channel may transmit a number of commands without waiting for receipt of status of operation frames. For example, again making reference to the illustrative system of FIG. 7, a first command may be executed that writes data to a first address in the storage device 306b, and a second command that writes data to a different address in the storage device 306b may be executed immediately thereafter. The channel may transmit both commands along with their accompanying data in a single data transmission requiring only one propagation delay through the communication path 304 between the storage controllers 302a–b. After each command and its associated data is transferred from the storage controller 302a, responsibility for monitoring the successful completion of the command is passed to the status checking entity in the storage controller 302a which waits for the status of operation frame to be received for each command, ensuring that the command has successfully completed execution. If a problem or special condition is encountered with any of the commands resulting in a failure to receive the status of operation frame, error recovery is performed in a manner discussed below.

The protocol shown in FIG. 11 provides improved performance by allowing multiple commands, with their associated data transfers, to be accomplished in a single data transmission, without incurring the additional propagation delay that would be required to await receipt of a status of operation frame before executing a next instruction. Thus, in the illustrative system of FIG. 7, the storage controller 302a may write in consecutive commands to two different addresses in the storage device 306b. In accordance with one embodiment of the invention, commands to the same target volume are synchronized, such that a later command to the same volume will not be executed until a status of operation frame has been received for a command previously transmitted to that volume. The synchronization of two commands directed to the same target volume is beneficial where two successive commands may be interdependent. For example, in the illustrative system of FIG. 7, a first command could search for a particular area in the storage device 306b to be written, or could define the format to be used for a subsequent write, and the next command could actually write the data. If the first command does not execute properly, the second command (i.e., the one that actually writes the data) may write data to the wrong location or in the wrong format.

Although synchronization between commands that share the same target address provides the above-described advantage, it should be understood that the invention is not so limited, and that for some applications, synchronization may not be required even for two commands that target the same device.

It should be understood that moving the handshaking level provided by the status of operation frame into the background in the protocol of FIG. 11 can result in potentially greater recovery penalties when an error is detected, because execution of a number of subsequent instructions will generally have begun before an error is detected. As with the embodiments discussed above, error recovery can be achieved by re-executing a group of commands from the beginning when an error is detected with any of the commands. If the command does not successfully execute when retried, the link between the channel and control unit may be reinitialized and the group of commands may then be retried again. For example, in the illustrative system of FIG. 7, the storage controller 302a has the capability of bringing down the link with the storage controller 302b, or vice versa, and re-executing any group of commands in which an error was detected.

In one embodiment of the invention, a technique is preferably employed so that when the channel or control unit receives a status of operation frame, it is able to identify the commands to which the frame relates. In one embodiment of the invention, each of the status of operation frames includes the target device address associated with the command. In this embodiment of the invention, commands to a common target address are synchronized by refraining from beginning any later commands to a target address until a status of operation frame has been received in connection with all commands previously transmitted to that target address. Thus, the device address included in the status of operation frame uniquely identifies only one command open at any given time.

As with the protocol of FIG. 10, if the receiving device (e.g., the control unit in FIG. 11) is not ready to receive data sent by the transmitting device (e.g., the channel in FIG. 11), the data will simply be discarded and the transmitting device will be notified via the information contained in the status of operation frame, or by the non-receipt of the status of operation frame, prompting retransmission of the command.

One illustrative error handling routine in connection with the protocol of FIG. 11 will now be described. In this description, a number of fields in the status of operation frame are described making reference to terminology defined by IBM in connection with the ESCON protocol. However, it should be understood that the invention is not limited in this respect, and that the status frames used in connection with this illustrative error handling routine can be implemented in a number of other ways.

As discussed above, the protocol of FIG. 11 may be implemented by providing two entities, i.e., an entity that controls the command being transmitted between the channel and control unit, and another that checks for the return of status of operation frames for other open commands previously transmitted over the link but not yet completed. In this embodiment of the invention, when a new command is transmitted from the channel or control unit, the status checking entity associated therewith sets a timer establishing a time period within which it is expected that a status of operation frame will be received if the command is executed properly. If the status checking entity determines that the timer has expired for any of the open commands that it monitors without receipt of a corresponding status of operation frame, the status checking entity causes that command to be re-executed.

As should be appreciated from the foregoing, the setting of a timer for the status of operation frame is all that is required to handle one of the error conditions that could potentially occur using the protocol of FIG. 11. In particular, if a command transmitted from one of the channel or control unit is not received by the other due to a problem with the transmission medium, the intended recipient will obviously not respond by sending a status of operation frame. Therefore, the timer on the sending device will eventually expire, resulting in re-transmission of the command.

The other general types of error or other special conditions arise when the command is transferred over the transmission medium to the receiving device (e.g., the control unit in the examples above), but the receiving device or a target address associated therewith is busy or otherwise unable to process the command (e.g., if the received data is corrupted). In the IBM ESCON protocol, when such a condition occurs, the receiving device sends a status of operation frame that includes a UNICHECK field that identifies that a special condition has occurred at the receiving device. For the ESCON protocol in the example command shown in FIG. 8, the status of operation frame including the UNICHECK status would be transferred to the channel, which would then ask the control unit to send thirty-two bytes identifying the nature of the special condition. In accordance with one embodiment of the present invention, two propagation delays are saved because the device that detects the special condition automatically sends a status of operation frame that not only specifies that a special condition (i.e., a UNICHECK) has occurred, but also includes the substantive information (e.g., the thirty-two bytes of status in the ESCON protocol) identifying the nature of the special condition.

The types of error or special conditions that result when a command is successfully transferred across the transmission medium can be generalized in the following three classes, each of which is discussed below along with the manner in which these conditions are handled in accordance with one embodiment of the present invention: (1) the target address at the receiving device may be unable to process the command at the time received; (2) the receiving device (as opposed to the particular target address associated therewith) may be busy and unable to process the command at the time received; (3) a problem (e.g., corrupted data) may be detected with the data transferred over the transmission medium.

Dealing with the first of these three conditions, and referring to the illustrative system shown in FIG. 7 as an example, the storage controller 302a may, for example, transfer a write command to a particular target volume in the storage device 306b. If the target volume is in the process of handling a previous write operation or is otherwise unable to process the write operation when received, the storage controller 302b will return a status frame to the storage controller 302a indicating that the received command is not being-processed normally. Using the conventional IBM status fields for illustrative purposes as mentioned above, the status of operation frame returned from the storage controller 302b would indicate a "command retry", which includes a status field specifying a "channel end" condition, but not a "device end" condition. The channel end condition indicates to the transmitting device that the phase of transmitting data is over. The device end condition, when specified, indicates that the receiving device is ready to accept the next command. Thus, the command retry status indicates to the transmitting device that the command will need to be re-sent, but does not indicate that it be re-sent immediately. In addition, the status of operation frame sent by the storage controller 302b would also indicate that the target volume address for the command be disconnected from the channel, indicating that no further commands should be sent to that target volume address until its status is updated.

In response to the receipt of a status of operation frame that does not specify a "device end" and that indicates that the target volume should be disconnected from the link, the transmitting device (e.g., the storage controller 302a acting as the channel in the example discussed above) will not send any additional commands to that target volume until an additional status of operation frame is received indicating that the target volume has been reconnected and is prepared to receive additional commands. Thus, the receiving device (e.g., the storage controller 302b acting as the control unit in the example above) then has time to process its previously-received commands and data and to ready itself to receive additional commands.

It should be understood that the command sent to the receiving device that resulted in the status of operation frame indicating the special condition discussed above is simply discarded at the receiving side. However, the other commands that follow, potentially in an uninterrupted group of commands with no gaps therebetween as discussed above, are processed in the normal fashion. Thus, only the command directed to the particular target address is flushed, with the commands to all other target volumes being processed normally. In the illustrative example discussed above, only the particular target volume in the storage device 306b is disconnected from the link, not the entire controller 604b or ESCON interface unit 606b that acts as the control unit.

When the target volume of the command that resulted in the UNICHECK becomes available to receive additional commands, it notifies the transmitting device by sending another status of operation frame, this time specifying a "device end" condition, identifying to the transmitting device that the target volume is ready to receive another command. When the status checking entity of the transmitting device receives such a status of operation frame, it causes the command or command sequence in the process that initially resulted in the UNICHECK condition to be re-executed.

Priority may be given to the command being re-executed to maximize the likelihood of the command completing successfully. Therefore, after the status of operation frame specifying the device end condition is transmitted to indicate that the previously unexecuted command should be retried, the receiving device (i.e., the storage controller 302b in the example discussed) flushes any new commands it has stored in its pipeline or thereafter receives until it is provided with an indication from the transmitting device (e.g., storage controller 302a) that the flushing should cease and that the next command should be processed normally (e.g., the next command may initiate error recovery). In one illustrative implementation, the transmitting device provides such an indication through the use of the status accepted frame. As indicated above, in the protocol of FIG. 11, the status accepted frame is not generally transmitted. It is used only for this special condition.

When the transmitting device receives the status of operation frame specifying the device end condition that indicates that the command should be retried, the transmitting device sends the status accepted frame to the receiving device, followed by the command being re-executed. Receipt of the status accepted frame indicates to the receiving device that it should cease flushing the commands received over the transmission medium (e.g., channels 610a–b in FIG. 7) because the command following the status accepted frame is the command to be re-executed. The transmitting device may send along with the re-executed command a next group of commands to be executed, with each being grouped together to reduce the average propagation delay per command in the manner described above. With respect to the commands that were flushed by the receiving device (the storage controller 302b in the illustrative example), the timers set in the status checking entity will eventually expire for each of these commands, resulting in each of these commands being retransmitted as discussed above.

It should be understood that although priority is given to the re-execution of commands in the implementation described above through the flushing of the other commands received prior to the status accepted frame, the invention is not limited in this respect. Thus, it is believed that the special condition handling routine could be implemented so that when a command is re-executed, the other commands are not flushed and are processed in the order received, with the re-executed command being processed in the order in which it is received at the receiving device.

Referring to the illustrative system in FIG. 7, it should be understood that although the communication channels 610a–b between the storage controllers 302a–b typically transmit a number of commands that are open simultaneously, the interface between the ESCON interface unit 606b and the controller 604b, as well as that between the ESCON interface unit 606a and the controller 604a may also operate in a more conventional fashion on one command at a time. In the example above, after the storage controller 302b has sent a status of operation frame indicating a command retry for a particular target volume along with status indicating a channel end condition that disconnects that target volume from the link but not a device end, the storage controller 302b may continue to process an uninterrupted group of commands received over the communication channels 610a–b. Thus, the interface between the ESCON interface unit 606b and the controller 604b may be busy every cycle, with data frames being sent from the ESCON interface unit 606b to the controller 604b, and the controller 604b returning status information indicating whether the operation was completed properly with the target volume in the storage device 306b. Thus, unlike the communication channels 610a–b, the link between the ESCON interface unit 606b and the controller 604b typically operates on only one command at a time.

When the controller 604b determines that a disconnected target volume on which a command retry condition previously occurred is now ready to retry the command, in the special condition handling routine discussed above, the controller 604b so specifies by sending a status of operation frame indicating a device end condition for the target volume. In accordance with one illustrative embodiment of the invention, the controller 604b sends the appropriate status of operation frame when it determines that the target volume is ready to retry the command. At that point, the interface between the controller 604b and the ESCON interface unit 606b cannot simultaneously be used to also transmit status for the next command in the pipeline of the ESCON interface unit 606b, so that the status frame for the next pipelined command is not sent. However, in the embodiment of the special condition handling routine discussed above, the next command in the pipeline is flushed, such that no status is returned for that command.

As mentioned above the second general type of UNICHECK condition arises when the receiving device (e.g., the ESCON interface unit 606b/controller 604b in the example above) is not capable of processing the received command. This may result from the control unit being busy performing other operations directed to either the target address of the command or any other target address. Thus, this condition differs from the first condition discussed above because it is not limited solely to the target address to which the command is directed, but more generally impacts every command. Thus, in one embodiment of the special condition handling routine, this type of UNICHECK condition is handled by disconnecting the receiving device from the link and flushing all received commands, not just those directed to the target address of the command that resulted in the UNICHECK, until the receiving device signals that it is prepared to receive additional commands.

Using the conventional IBM status fields for illustrative purposes as mentioned above, the status of operation frame returned from the storage controller 302b would indicate a "control unit busy" condition specifying to the transmitting device that no additional commands should be sent to the control unit until further notice. In this manner, the entire control unit (e.g., the ESCON interface unit 606b) is disconnected from the link, rather than just a particular target address as with the first condition discussed above. Once the control unit is prepared to receive additional commands, a second status frame is sent indicating a "control unit end" condition specifying that the control unit is ready for the transmitting device to send additional commands.

In a manner similar to that discussed above in connection with the command retry condition, after the control unit sends the first status frame indicating the busy condition, the control unit flushes all commands that are in its pipeline or are thereafter received over the link. In response to the first status frame indicating the busy condition and the subsequent second status frame indicating that the control unit is prepared to receive additional commands, the channel transmits a status accepted frame, indicating that flushing of commands received over the link should cease. The transmitting device may send along with the re-executed command a next group of commands to be executed in a single data transmission to reduce the average propagation delay per command as discussed above.

The third and final general type of UNICHECK condition discussed above arises when the receiving device (e.g., the control unit or ESCON interface unit 606b/controller 604b) is not capable of processing the received command because of a problem that is not particular to the receiving device or any of its associated target addresses. An example of such a problem is potential corruption of the data received over the link. Like the second condition discussed above, this type of error or special condition is not limited to simply the target address to which the command that results in the UNICHECK is directed, and will more generally impact every command. Thus, in one embodiment of the special condition handling routine of the present invention, this type of UNICHECK condition is handled in essentially the same manner as the second class of situations discussed above, i.e., by disconnecting the receiving device from the link and flushing all of the received commands, not just those directed to the target address of the command that resulted in the UNICHECK.

Using the conventional IBM status fields for illustrative purposes as mentioned above, the status of operation frame returned from one of the storage controllers 302a–b could also indicate a "control unit busy" or some other condition specifying to the transmitting device that the control unit is disconnected from the link and that no additional commands should be sent to the control unit until further notice. Once the control unit is prepared to receive additional commands, a second status frame may be sent indicating a "control unit end" or some other condition specifying that the control unit is reconnected and ready for the transmitting device to send additional commands. After the control unit sends the first status frame indicating the disconnected condition, the control unit flushes all commands stored in its pipeline and thereafter received over the link. In response to the second status frame indicating that the control unit is prepared to receive additional commands, the channel transmits a status accepted frame, indicating that the flushing of commands received over the link should cease, followed by a retry of the command that initially caused the UNICHECK condition to occur.

As should be appreciated from the foregoing, the above-described error or special condition handling routine provides one illustration of how special conditions can be handled in conjunction with the protocol of FIG. 11, wherein a group of commands is transmitted in a single data transmission, without awaiting any handshaking signals between commands indicating that each has completed successfully. However, it should be understood that the present invention is not limited to the particular error handling routines discussed above, and that other techniques for handling special conditions can alternatively be employed.

The optimal number of instructions that should be open at any one time when using the protocol of FIG. 11 will vary depending upon the configuration of the system. In general, system performance increases with the number of instructions open at any one time until the point is reached where the number of open commands keeps the link between the channel and control unit full, such that no propagation delays are incurred due to gaps between consecutive commands. However, the greater the number of commands that can be open at any one time, the greater the support facilities required. Furthermore, when error recovery is performed by re-executing all instructions subsequent to the one for which an error was detected, the larger the number of open instructions, the longer the error recovery time. Thus, depending upon the reliability of the transmission medium between the control unit and the channel, it may be desirable to maintain the number of open commands at a small enough level so that error recovery can be performed relatively efficiently.

Each device that communicates using the protocols discussed above (e.g., the ESCON interface units 606a–b in FIG. 6) may include a processor that is programmed by software to generate and respond to the handshaking signals discussed herein which implement the protocols of the present invention. For example, the processors may be selected from the Motorola 68xxx family of processors. It should be understood that a number of other types of suitable processors may alternatively be used. Furthermore, although a programmed processor provides a simple and straightforward implementation of a device for communicating using the above-described protocols, it should be understood that such a device may also be implemented using dedicated hardware.

The protocols discussed above are well suited to use with a system such as the one shown in FIG. 6, wherein a pair of storage controllers 302a–b causes the storage devices 306a–b to mirror one another such that any changes made to the storage device 306a are also made to the storage device 306b, and vice versa. The storage controllers 302a–b may be connected via a T1 or T3 line, or any other communication medium that enables the storage controllers 302a–b to be disposed remotely from one another. One of the ESCON interface units 606a–b implements and performs the role of the channel 402 (FIG. 4) and the other of the ESCON interface units 606a–b serves the role of the control unit 404 (FIG. 4) in implementing the protocols shown in FIGS. 8–11. When data is to be transferred from the storage device 306a to the storage device 306b the ESCON interface unit 606b is the only control unit coupled to the channel implemented by the ESCON interface unit 606a, and, when data is to be transferred from the storage device 306b to the storage device 306a, the ESCON interface unit 606a is the only control unit coupled to the channel implemented by the ESCON interface unit 606b. Thus, it is believed that the protocols of FIGS. 9–11 will work successfully in such a system, and any errors resulting from the reduced handshaking in the modified protocols will be insignificant in view of the substantial performance improvements provided by these protocols. Using the above-described protocols, communication links significantly longer than dedicated ESCON links may be used, with the only limitation on distance being the manner in which the performance requirements of the system are affected by the increased propagation delay that results from increased distance.

Figure 12:
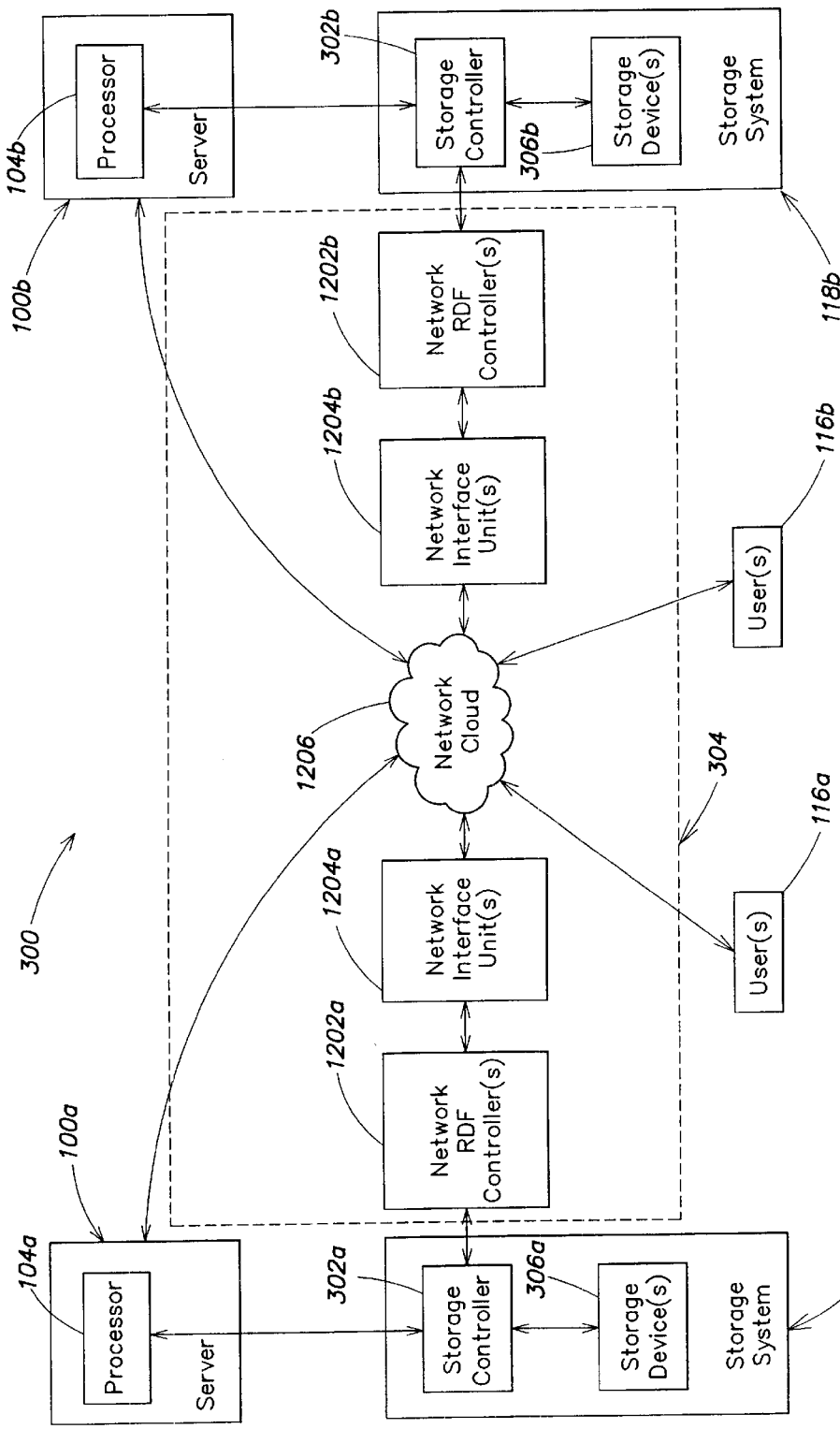
FIG. 12 is a block diagram of another illustrative embodiment of the network system of FIG. 3 in which the network cloud is used to establish the communication path between the storage systems.

FIG. 12 shows yet another illustrative embodiment of the network system 300, wherein a communication network (i.e., a network cloud 1206) that is accessible by other resources on a multiplexed basis is used to implement the path 304 (FIG. 3) between the storage controllers 302a–b, such that the storage controllers 302a–b do not have exclusive use of any portion of the network cloud 1206. As shown in FIG. 12, the network cloud 1206 may either be the same network cloud used to couple the Web servers 100a–b (e.g., network cloud 114 in FIG. 3), or may encompass a different network cloud. The network cloud 1206 may be implemented using the Internet, an intranet, and/or any other network. In one illustrative embodiment, for example, the network cloud 1206 is implemented using the Internet, and is used to couple the Web servers 100a–b, and to couple the storage systems 118a–b through a path that does not pass through the Web servers 100a–b. In contrast to a dedicated ESCON link or the use of a dedicated public communications resource (e.g., a T3 line), the network cloud 1206 of the FIG. 12 embodiment is a resource that typically is shared by the storage controllers 302a–b and one or more other users 116a–b.

As mentioned above, in one illustrative embodiment of the invention, the network cloud 1206 is implemented via the Internet. Since most user sites in which the storage controllers 302a–b are located (e.g., Web servers as discussed above) will have easy access to the Internet, no significant costs will be incurred in implementing the network cloud 1206. In addition, the use of the network cloud 1206 renders it unnecessary to lease a dedicated public communication line to interconnect the storage controllers 302a–b, resulting in a less expensive implementation of the network system 300. It should be appreciated that in view of the fact that the network cloud 1206 may not be dedicated to the network system 300 and may be shared with one or more other users 116*a–b,* the performance of the system may not be as great as if a dedicated line were used to implement the path 304 (FIG. 3). However, for some system configurations, the cost savings will more than compensate for any decrease in performance.

As also mentioned above, in another illustrative embodiment of the invention, the network cloud 1206 is implemented via an intranet or private enterprise network. It should be appreciated that an intranet is similar in some respects to the Internet in that a number of different users and applications typically share the resource, but the network is exclusively reserved for a private enterprise. In addition, an intranet may have one or more gateways enabling access to the Internet. An intranet is typically implemented through a public communications network (e.g., using leased lines such as a T3 line), although an intranet may alternatively be implemented using dedicated private lines. The use of an intranet as the network cloud 1206 that implements the path 304 (FIG. 3) between the storage controllers 302*a–b* allows an enterprise to implement the bi-directional mirroring of the storage systems 118*a–b* in the network system 300 in an inexpensive manner using an existing enterprise network, requiring little or no changes to the network configuration.

In another embodiment of the invention, the network cloud need not be shared with any resources, and may be dedicated solely to implementing the path 304 (FIG. 3) for the network system 300. It should be appreciated that for some user installations, a pre-existing network cloud may exist that is no longer used for other applications. As with the use of the Internet or an intranet shared with other resources, the use of a pre-existing network cloud dedicated to the network system 300 provides a convenient and cost effective way of implementing the path 304 (FIG. 3). Obviously, for this embodiment of the invention, the network cloud used to implement the path 304 (FIG. 3) would be different from that cloud 114 that couples the Web servers 100*a–b* to other users 116*a–b*.

As shown in FIG. 12, the network system 300 may include some additional hardware to interface both the storage controllers 302*a–b* to the network cloud 1206. In particular, on each side of the illustrative network system 300 shown in FIG. 12 is provided one or more network remote data facility (RDF) controllers 1202 and one or more network interface units 1204. In one embodiment of the invention, this additional hardware is designed to be essentially transparent to the storage controllers 302*a–b*. As discussed above, the latency of the information transferred through the network cloud 1206 may be greater than when using a dedicated communication path 304 such as the ESCON or T3 link discussed above. Thus, timeouts for awaiting the handshaking signals in the protocols discussed above in connection with FIGS. 8–11 may be increased to reflect the expected greater latency.

As discussed above, the storage controllers 302*a–b* perform the function of implementing the protocol for transferring information between them. Any of the protocols discussed above may be employed. However, it should be appreciated that the present invention is not limited in this respect, and that various other protocols can be employed for transferring information between the storage controllers 302*a–b* through the network cloud 1206. As discussed above, the protocol for transferring information between the storage controllers 302*a–b* may be implemented via a processor in each of the storage controllers 302*a–b* that is programmed by software to generate and respond to the handshaking signals that implement the protocol. Alternatively, dedicated hardware may be employed to implement this protocol.

The purpose of the network RDF controllers 1202 is to place the information that implements the RDF protocol into a format that is capable of transmission through the network cloud 1206, and to control the transport of the information through the cloud. These functions can be performed in any number of ways, as discussed in more detail below. In one embodiment of the present invention, each of network RDF controllers 1202 is implemented as a standard IBM compatible personal computer (PC) that can be programmed to perform the desired functions. Implementing each of network RDF controllers 1202 as a PC is advantageous because such commodity based hardware is relatively inexpensive. However, it should be understood that the invention is not limited in this respect, and that a number of other types of processors can alternatively be used. Furthermore, although a programmed processor provides a simple and straightforward implementation, it should be understood that the network RDF controller may also be implemented using dedicated hardware.

Each of the network interface units 1204 provides a direct or indirect connection to the network cloud 1206, and can be implemented in any of a number of different ways. The hardware to implement the network interface unit may be obtained from a network service provider, or may be purchased from a networking equipment supplier. Thus, the network interface unit may, like the network RDF controller, be implemented using commodity based equipment in a cost effective fashion. Those of ordinary skill in the art will appreciate that a number of different direct physical connections to the network cloud 1206 are possible, including, but not limited to, Ethernet, Fast Ethernet, Gigabit Ethernet, fibre channel, asynchronous transfer mode (ATM) and FDDI connections. In addition, a number of indirect connections are also possible through an Internet or network service provider. The particular hardware employed will depend upon the service provider. Typical options include standard PC modems, network adapters, ADSL, cable modems and asynchronous modems. Again, the present invention is not limited to any particular type of connection to the network cloud, as numerous options are currently possible, and as it is expected that additional options will continue to become available.

Each of the network RDF controllers 1202 may include a host bus adapter (not shown) that enables communication with one or more network interface units 1204. The particular nature of each host bus adapter will depend upon the type of network interface units 1204 used to interface the network RDF controllers 1202 to the network cloud 1206. When a network RDF controller 1202 is implemented as a PC, that network RDF controller's host bus adapter may be implemented as a card that plugs into an internal PC bus (e.g., a standard PCI bus) and is specifically adapted to communicate with the type of physical connections implemented by the corresponding network interface units 1204.

Each of the network RDF controllers 1202 may be coupled to the network cloud 1206 through a single port or network interface unit 1204. However, in an alternate implementation, multiple connections are provided to the network cloud to achieve increased performance. It should be appreciated that each path through the network cloud 1206 between a pair of the network interface units 1204 may be relatively slow. Therefore, by distributing the data to be transferred over the network cloud 1206 amongst a plurality of network interface units 1204, the network RDF controllers 1202 can achieve improved performance by sending packets of information in parallel through the network cloud 1206, thereby creating a larger virtual pipe through the network cloud by combining a plurality of smaller physical pipes to the network cloud. Since each of the connections provided by the network interface units 1204 to the network cloud 1206 is relatively inexpensive, a relatively large number of connections (e.g., fifty) can still be cost effective for a user, while providing satisfactory performance in the transmission of packets of information over the network cloud 1206.

Figure 14:
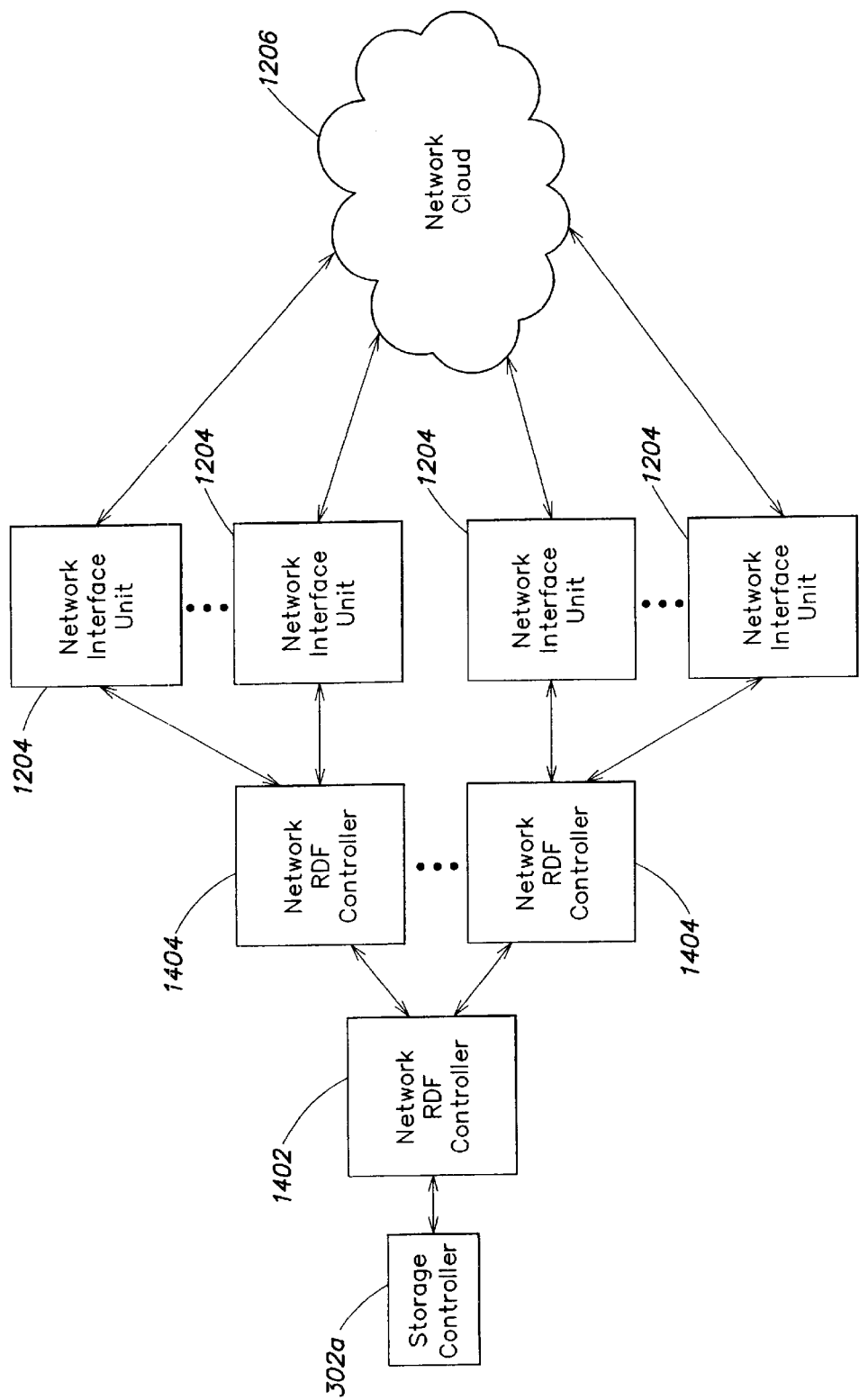
FIG. 14 is a block diagram illustrating the fragmentation of information via multiple controllers in accordance with one implementation of the embodiment of the invention shown in FIG. 12.

It should be appreciated that in addition to distributing the data sent from the network RDF controllers 1202 to the network interface units 1204 as shown in FIG. 12, load sharing can also be performed at a number of other levels. For example, as shown in FIG. 14, multiple network RDF controllers may be provided, including a network RDF controller 1402 coupled to the storage controller 302a and a plurality of second level network RDF controllers 1404, each coupled to a corresponding network interface unit 1204. In this implementation, data is initially distributed within the first level network RDF controller 1402, and then is further distributed in each of the second level network RDF controllers 1404. Although FIG. 14 illustrates a cascading of the network RDF controllers on only one side of the network cloud 1206, it should be appreciated that such cascading may also be performed on the other side. In addition, data distribution may also be performed in the storage controller 302a, such that the storage controller 302a can be coupled to two or more network RDF controllers.

Performance is maximized in connection with the multiple paths into the network cloud by balancing the load passed between the various network interface units 1204. Load balancing may be achieved using conventional techniques, such as dynamic buffer management. Similarly, the distribution of the data may be performed using conventional techniques, such as a one-to-many queue that incorporates heuristics for circuit metering. The re-combination of the data also may be accomplished using conventional techniques, such as a many-to-one queuing mechanism with order being preserved by the tag information included with each individual packet in accordance with the Internet Protocol discussed below.

Figure 13:
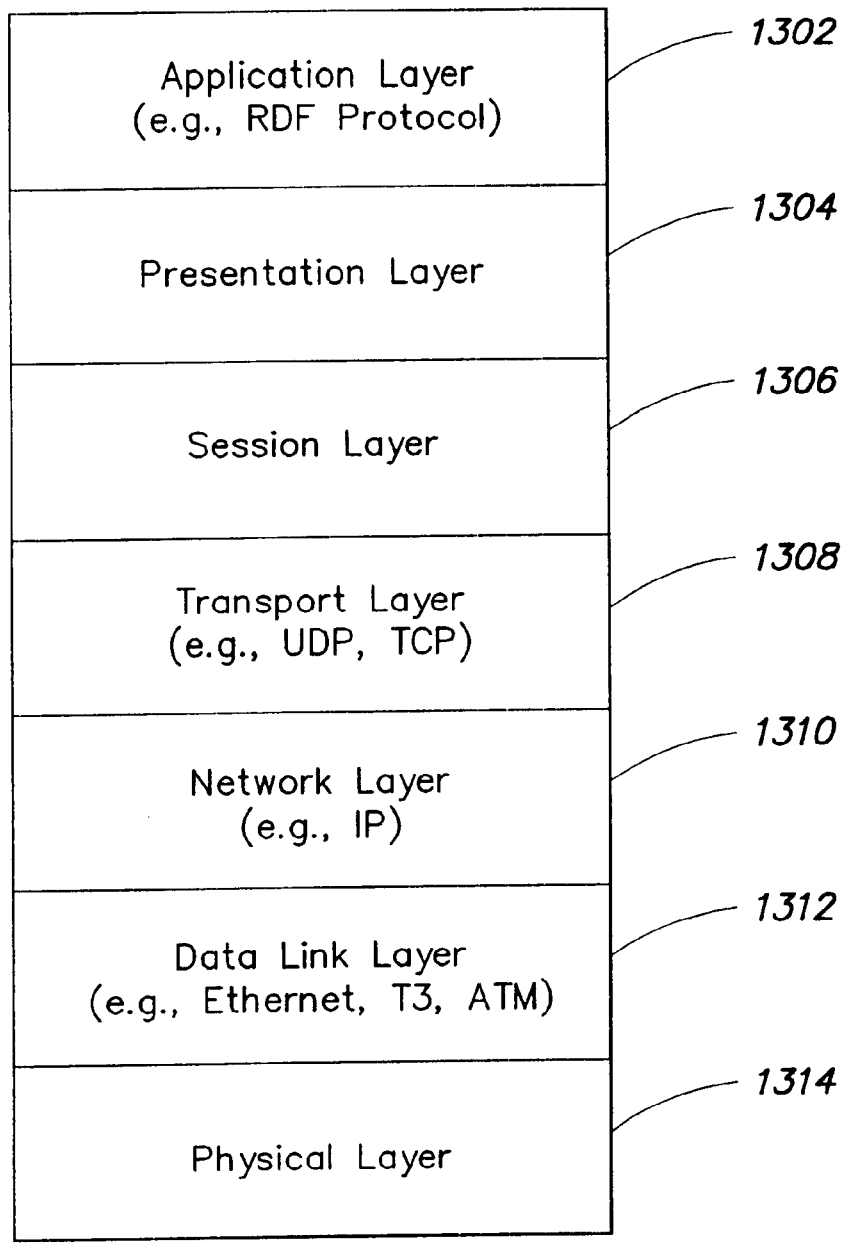
FIG. 13 is a table showing a number of layers and protocols that may be used in implementing the embodiment of the present invention shown in FIG. 12.

A schematic representation of a number of software and hardware levels that can be employed to implement the illustrative embodiment of the invention shown in FIG. 12 is provided in FIG. 13. FIG. 13 illustrates a seven layer model in accordance with the Open Systems Interconnection (OSI) Reference Model developed by the International Standards Organization (ISO).

At the top layer 1302 is the application, which in this example is a protocol that implements the transfer of information between the storage controllers 302a–b to implement the remote data facility (RDF). This protocol may, for example, be any of the protocols discussed above.

The next layer 1304 is the presentation layer, which defines the format of the data transferred by the application. In one illustrative implementation, no distinct presentation layer is provided, and the format of the data is defined in the application layer 1302.

The next layer 1306 is the session layer, which implements protocols for manipulating the application data prior to transportation through the network cloud. Various embodiments of the present invention support features that can be implemented in the session layer. For example, the control for the distribution of the data through multiple pipes (i.e., network interface units) into the network cloud can be implemented in the session layer. A number of proprietary systems have been developed for implementing the distribution of data through multiple pipes into a network cloud, such as the Internet or an intranet, for different types of applications, but no standard has been adopted. The present invention is not limited to any particular implementation.

Various other techniques for manipulating the application data may also be implemented in the session layer, including encryption and compression techniques discussed below.

Next is the transport layer 1308 for moving packets of information over the network cloud. It should be appreciated that when packets of information are sent from a source to a destination through the network cloud 1206, the packets may not arrive in the same order at the destination, and some packets may become lost. The transport protocol splits the data into multiple packets at the source (e.g., the storage controller 302a), tags those packets to indicate the destination, then acknowledges receipt of each of the packets at the destination and reconstructs the packets in the proper order. In addition, if any packets are lost, the transport protocol can recover the lost packets and/or request that the source re-send the packets. Thus, the transport protocol provides an end-to-end reliable link between the network RDF controllers 1202 via the network cloud. Examples of conventional transport protocols that may be employed with the RDF application of the present invention include the User Datagram Protocol (UDP) which is a connectionless protocol, and the Transmission Control Protocol (TCP) which is a connection-oriented protocol. However, it should be appreciated that the present invention is not limited to the use of any particular transport protocol as others are possible. The transport protocol may be implemented in the network RDF controller(s) 1202, e.g., by software running on a PC when the network RDF controller is implemented by a PC.

Next is the network layer 1310 that builds packets of information to be passed over the cloud 1206. An illustrative example for the network layer is the Internet Protocol (IP), which is the protocol that is used in passing information over the Internet. In accordance with the Internet Protocol, information is passed across the Internet in packets, each with an address identifying the destination of the packet. The generation of the packets and implementation of the Internet Protocol may be performed, like the transport layer, in the network RDF controllers 1202.

Next is the data link layer 1312 that defines the physical format of the data to be transferred to and/or from the network cloud. As discussed above, any number of alternatives may be employed (e.g., Ethernet, T3, FDDI and ATM), with the present invention not being limited to any particular type of physical connection.

Finally, the lowest level of communication is the physical layer 1314 that is the actual physical link used to interface the network RDF controllers 1202 to the network cloud 1206. As discussed above, any number of alternatives may be employed (e.g., coaxial cables, fiber optic cables, copper cables, etc.), with the present invention not being limited to any particular type of physical connection.

As discussed above, conventional remote mirroring data facilities have employed either a dedicated ESCON link or a dedicated leased line to implement the path 304 (FIG. 3). Thus, conventional remote mirroring data facilities have employed a circuit switched connection, wherein all information transferred between the storage controllers 302a–b passes over the same path through the connection. In contrast, it should be appreciated that one aspect of the embodiment of the invention shown in FIG. 12 is directed to the implementation of the path 304 (FIG. 3) in the network system 300 using a packet switched or cell switched network, wherein information can be passed between the storage controllers 302a–b through different paths through the network. As will be appreciated by those of ordinary skill in the art, packet switched networks can pass information between two points on the network through a plurality of different paths, with the information being split into multiple packets at the source, and then being reconstructed in the proper order at the destination. Cell switched networks (e.g., ATM networks) work in a similar fashion, except that information is split and distributed on cell boundaries, rather than packet boundaries. Typically, packet switched networks employ variably sized packets, whereas cell switched networks utilize cells of information having a fixed size.

It should be appreciated that by implementing the path 304 (FIG. 3) between the storage controllers 302a–b in the network system 300 via the network cloud 1206, a number of features commonly supported in such networks may be employed. One of these features is a multi-cast feature wherein data transferred from each source may be transmitted to more than one destination. Another related feature is a broadcast wherein data transferred from one source is transmitted to all destinations. Using either of these features, the network system 300 may be employed wherein each storage controller 302 can cause any updates to the contents of its storage device 306 to be transmitted to two or more other storage controllers 302 for storage by their storage devices 306, so that coherency can be maintained among three or more server storage systems 118.

It should be appreciated that some network clouds employ wireless links, including satellite links or land-based links such as a point-to-point microwave communication system. Such wireless communication techniques may be used to implement the path 304 (FIG. 3) in the network system 300, rather than employing the network cloud 1206. The wireless transmission link may be implemented using any type of wireless technology (e.g., satellites and point-to-point microwave transmission) and may be implemented as a private system or may be leased from a service provider.

Figure 15:
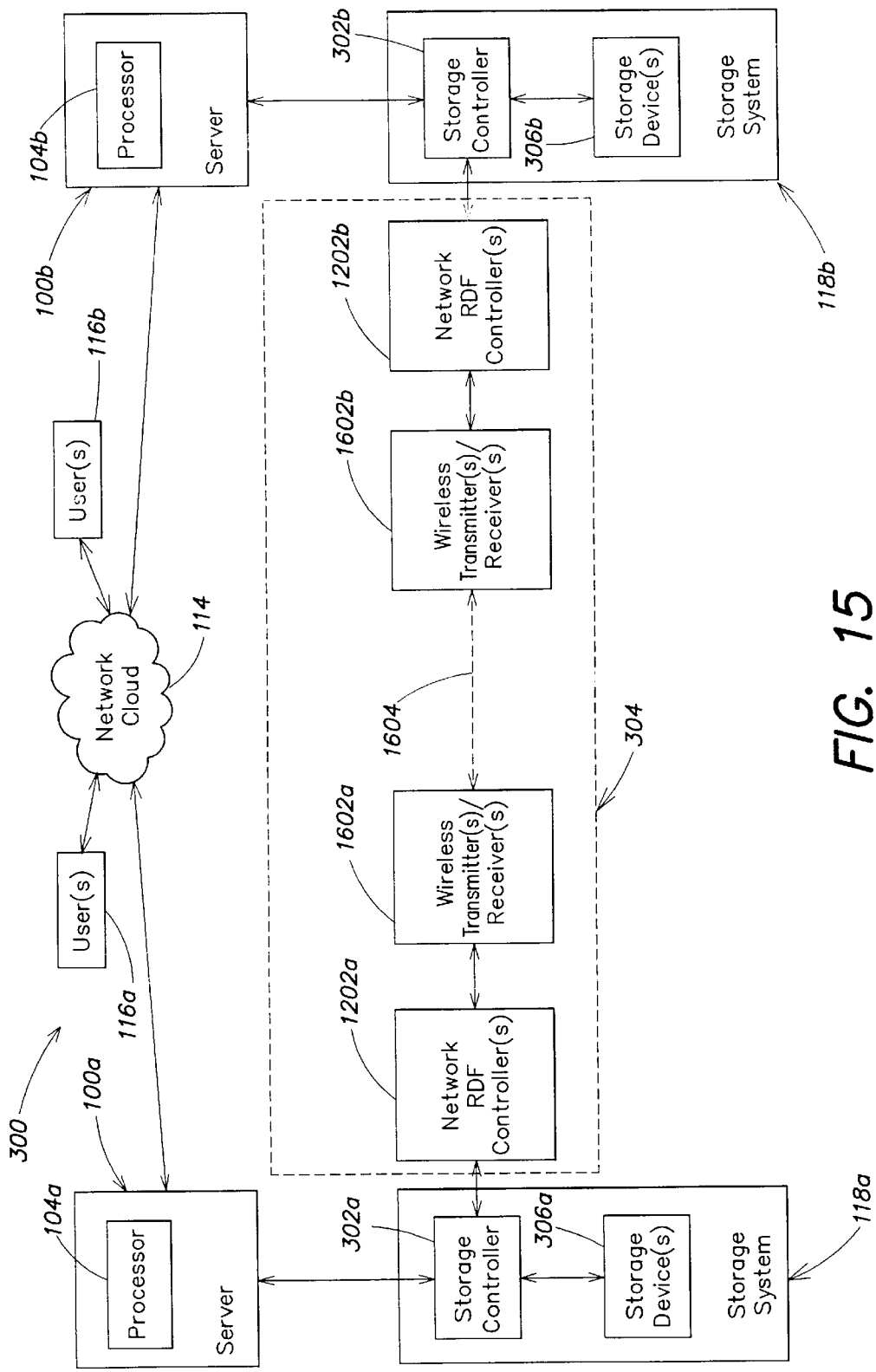
FIG. 15 is a block diagram of another illustrative embodiment of the network system of FIG. 3 in which a wireless communication path between the pair of storage systems is employed.

An illustrative implementation of the embodiment of the present invention that employs a wireless communication system to implement the path 304 (FIG. 3) between the storage controllers 302a–b is shown in FIG. 15. As seen in FIG. 15, each of the network RDF controllers 1202a–b is coupled to at least one wireless transmitter/receiver 1602. The wireless transmitters/receivers 1602 communicate via a wireless communication channel 1604, indicated in FIG. 15 by a dotted line. As discussed above, the wireless transmitter/receivers may be implemented using satellite technology, microwave point-to-point technology, or any other type of wireless communication technology.

In one implementation wherein each RDF controller 1202 is implemented by a PC, the PC may also execute a number of other functions for the processor 104a and its associated source storage system. In addition, at least one additional PC may also be provided that is on standby, and does not have any responsibilities during normal operation. In the event that a malfunction occurs with the main PC that implements a network RDF controller 1202, the standby PC may be used in its place, thereby increasing the reliability of the system.

Encryption techniques may be employed to provide security for the data transferred between the storage controllers 302a–b over the network cloud 1206. The encryption may be performed in any number of ways, and the present invention is not limited to any particular encryption technique. For example, encryption may be performed in software in each network RDF controller 1202, or dedicated hardware may be used.

Compression techniques may also be employed on the data transferred between the storage controllers 302a–b over the network cloud 1206. By compressing the data prior to transmission over the network cloud 1206, fewer packets of information will be sent over the network cloud 1206, thereby increasing the performance of the system. Compression may be performed using any number of techniques, and the present invention is not limited to any particular compression technique. For example, compression may be performed in software in each network RDF controller 1202, or dedicated hardware may be provided to implement the compression techniques.

The network system 300 may also support a store and forward option wherein data written to either of the storage systems 118 is also stored in a temporary storage area on that storage system's side of the path 304 (FIG. 3), and is then subsequently transferred from the temporary storage location to the storage system 118 on the other side of the path 304. By using this store and forward option, if desired by the user, the operation of each of the processors 104a–b is not impacted by the latency through the network cloud 1206 (FIG. 12).

The aspect of the present invention relating to maintaining data coherency between data sets employed via two or more servers by providing a communication path that does not pass through the servers was developed in connection with Web servers. However, it should be appreciated that the present invention is not limited in this respect, and may be used for other applications. In this respect, in addition to Web servers, there are a number of computer systems wherein two or more host computers are coupled together via a network cloud or other communication link and share data. Typically, in such systems coherency between the shared data sets is maintained via transferring data updates through a communication path passing through the host computers. This is disadvantageous for the same reasons discussed above in connection with the Web server application (e.g., host computer resources must be expended to transmit data updates). It should be appreciated that the aspects of the present invention discussed above may also advantageously be employed in such a system to maintain data coherence between two or more data sets.

Figure 16:
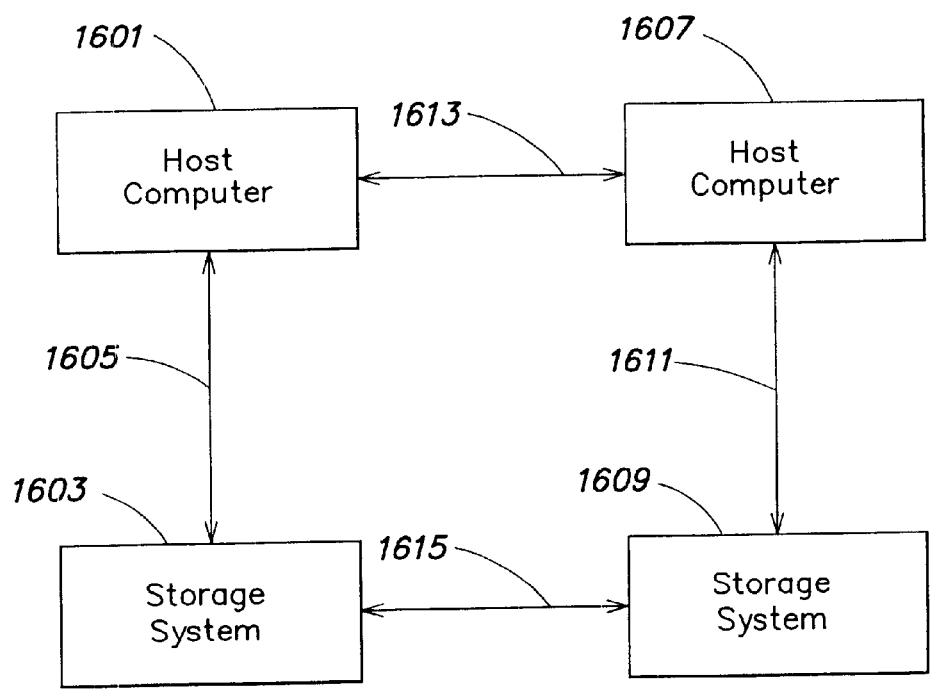
FIG. 16 is a block diagram of another illustrative embodiment of the present invention employed in a network system including a pair of general purpose host computers that share a data set.

FIG. 16 is a block diagram of a more general purpose computer system in accordance with which the above-described aspects of the present invention can be employed. The computer system of FIG. 16 includes a host computer 1601 coupled to a local storage system 1603 via a communication link 1605, as well as a second host computer 1607 that is coupled to a local storage system 1609 via a communication path 1611. The host computers are coupled together via a communication path 1613 that can be of any of numerous types. For example, the communication path 1613 may be a dedicated link between the host computers 1601 and 1607, or alternatively may be a network cloud (e.g., the Internet or an intranet) accessible to other users. In accordance with one embodiment of the present invention, a communication path 1615 is provided between the storage systems 1603 and 1609 and may be employed to maintain coherency between data sets stored thereon in the manner described above. As discussed above in connection with the application of the present invention relating to a Web site environment, the path 1615 may be a dedicated link or a network cloud. In this respect, the paths 1613 and 1615 may advantageously be implemented using a single network cloud, such that separate paths to the network cloud can be provided for each of the host computer 1601, the storage system, 1603, the host computer, 1607 and the storage system 1609. Thus, in accordance with the embodiment of the present invention shown in FIG. 16, aspects of the present invention can be employed to maintain data coherency in any computer system in which a pair of host computers share data stored on respective local storage systems.

As discussed above, the controllers (e.g., the storage controllers 302*a–b* in FIG. 3) that perform the aspects of the present invention can be implemented in numerous ways, such as with dedicated hardware, with one or more processors that execute microcode (firmware) or software to perform the functions recited above, or any combination thereof. In this respect, it should be appreciated that one implementation of the present invention comprises a computer readable medium (e.g., a computer memory, a floppy disk, a compact disc, a tape, etc.) encoded with a computer program that, when executed by a processor, causes the processor to perform the above-discussed functions to implement the present invention. The computer readable medium can be transportable, such that the program stored thereon can be loaded onto a storage controller to implement the aspects of the present invention discussed above.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system including first and second host computers and first and second storage systems, wherein the first storage system includes at least one physical storage device and is coupled to the first host computer to store data transferred from the first host computer to the first storage system and the second storage system includes at least one physical storage device and is coupled to the second host computer to store data transferred from the second host computer to the second storage system, a method of updating data stored on at least one of the first and second storage systems, the method comprising steps of:

(A) updating a first logical volume of data stored on the first storage system by writing to the first logical volume a first set of data transferred from the first host computer to the first storage system;

(B) receiving, at the first storage system, a second set of data transmitted from the second storage system to the first storage system via at least one communication path that does not pass through the first host computer; and (C) updating the first logical volume of data by writing to the first logical volume the second set of data transmitted from the second storage system.

2. The method of claim 1, wherein the step (B) includes a step of receiving the second set of data at the first storage system in response to the second set of data being transferred from the second host computer to the second storage system to update a second logical volume of data stored by the second storage system.

3. The method of claim 2, further including a step of:

repeating the steps (B) and (C) each time the second logical volume is updated with data from the second host computer so that the first logical volume of data stored on the first storage system mirrors the second logical volume of data stored on the second storage system.

4. The method of claim 2, further including steps of:

(D) updating the second logical volume of data stored on the second storage system with the second set of data transferred from the second host computer to the second storage system; and (E) transmitting the second set of data from the second storage system to the first storage system in response to the second set of data being transferred from the second host computer to the second storage system to update the second logical volume of data.

5. The method of claim 4, further including a step of:

(F) repeating the steps (B), (C), (D) and (E) each time the second logical volume is updated with data from the second host computer so that the first logical volume of data stored on the first storage system mirrors the second logical volume of data stored on the second storage system.

6. The method of claim 5, wherein the at least one communication path does not pass through the second host computer, and wherein the method further includes steps of:

(G) in response to the first logical volume of data being updated with the first set of data transferred from the first computer, transmitting the first set of data from the first storage system to the second storage system over the at least one communication path;

(H) receiving, at the second storage system, the first set of data transmitted from the first storage system to the second storage system via the at least one communication path; and (I) updating the second logical volume of data stored on the second storage system with the second set of data transmitted from the first storage system.

7. The method of claim 6, further including a step of:

(J) repeating the steps (A), (G), (H) and (I) each time the first logical volume is updated with data from the first host computer so that the second logical volume of data stored on the second storage system mirrors the first logical volume of data stored on the second storage system.

8. The method of claim 2, wherein the first and second host computers include, respectively, first and second network servers connected to a network cloud, and wherein the method further includes a step of:

(D) serving data from at least one of the first and second logical volumes of data to a client via the network cloud.

9. The method of claim 2, wherein the first host computer includes a first Web server connected to the Internet, and wherein the method further includes a step of:

(D) implementing a first Web site on the first Web server, thereby giving Web users access to the first logical volume of data via the Internet.

10. The method of claim 1, wherein the at least one communication path does not pass through the second host computer, and wherein the method further includes a step of:

(D) in response to the first logical volume of data being updated with the first set of data transferred from the first host computer, transmitting the first set of data from the first storage system to the second storage system over the at least one communication path.

11. The method of claim 10, further including steps of:
(E) receiving, at the second storage system, the first set of data transmitted from the first storage system to the second storage system via the at least one communication path; and
(F) updating a second logical volume of data stored on the second storage system with the first set of data transmitted from the first storage system.

12. The method of claim 11, further including a step of:
(G) repeating the steps (A), (D), (E) and (F) each time the first logical volume is updated with data from the first host computer so that the second logical volume of data stored on the second storage system mirrors the first logical volume of data stored on the second storage system.

13. The method of claim 11, further including steps of:
(G) updating the second logical volume of data stored on the second storage system with the second set of data transferred from the second host computer to the second storage system; and
(H) in response to the second set of data being transferred from the second host computer to the second storage system to update the second logical volume of data, transmitting the second set of data from the second storage system to the first storage system.

14. The method of claim 1, wherein the at least one communication path includes a network cloud, and wherein the step (B) includes a step of receiving the second set of data via the network cloud.

15. The method of claim 1, wherein the at least one communication path includes at least one communication link dedicated to directly coupling the first and second storage systems, and wherein the step (B) includes a step of receiving the second set of data via the communication link.

16. The method of claim 15, wherein the at least one communication link includes multiple communication links dedicated to directly coupling the first and second storage systems, and wherein the step (B) includes a step of receiving the second set of data via at least one of the multiple communication links.

17. The method of claim 1, wherein the at least one communication path includes a data communication channel operable within a public communications network, and wherein the step (B) includes a step of receiving the second set of data via the data communication channel.

18. In a computer system including first and second computers and first and second storage systems, wherein the first storage system is coupled to the first computer to store data transferred from the first computer to the first storage system and the second storage system is coupled to the second computer to store data transferred from the second computer to the second storage system, and wherein the first computer includes a first Web server connected to the Internet, a method of updating data stored on at least one of the first and second storage systems, the method comprising steps of:
(A) updating a first logical volume of data stored on the first storage system with a first set of data transferred from the first computer to the first storage system;
(B) receiving, at the first storage system, a second set of data transmitted from the second storage system to the first storage system via at least one communication path that does not pass through the first computer, the step of receiving being in response to the second set of data being transferred from the second computer to the second storage system to update a second logical volume of data stored by the second storage system;
(C) updating the first logical volume of data with the second set of data transmitted from the second storage system; and
(D) implementing a first Web site on the first Web server, thereby giving Web users access to the first logical volume of data via the Internet;
wherein the second computer includes a second Web server connected to the Internet and implementing a second Web site, wherein the first and second Web sites share a common Internet address, wherein the computer system further includes at least one load controller coupled to at least one of the first and second servers to direct each Web user using the common Internet address to one of the first and second Web sites so that the first and second Web sites together act as a single virtual Web site; and wherein the method further includes a step of:
(E) in response to a Web user using the common Internet address to access the virtual Web site, directing the user to one of the first and second Web sites.

19. In a computer system including first and second host computers and first and second storage systems, wherein the first storage system includes at least one physical storage device and is coupled to the first host computer to store data transferred from the first host computer to the first storage system and the second storage system includes at least one physical storage device and is coupled to the second host computer to store data transferred from the second host computer to the second storage system, a method of managing data stored on at least one of the first and second storage systems, the method comprising steps of:
(A) in response to a first logical volume of data stored on the first storage system being updated by being written with a first set of data transferred from the first host computer to the first storage system, transmitting the first set of data from the first storage system to the second storage system over at least one communication path that does not pass through either of the first and second host computers;
(B) receiving, at the first storage system, a second set of data transmitted over the at least one communication path by the second storage system; and
(C) updating the first logical volume by writing to the first logical volume the second set of data transmitted over the at least one communication path.

20. The method of claim 19, wherein the step (B) includes a step of receiving the second set of data at the first storage system in response to the second set of data being transferred from the second host computer to the second storage system to update a second logical volume of data stored by the second storage system.

21. The method of claim 20, further including a step of:
(D) repeating the steps (B) and (C) each time the second logical volume is updated with data from the second host computer so that the first logical volume of data stored on the first storage system mirrors the second logical volume of data stored on the second storage system.

22. The method of claim 20, further including steps of:
(D) transmitting the second set of data from the second storage system to the first storage system in response to the second set of data being transferred from the second host computer to the second storage system to update the second logical volume of data; and (E) repeating the steps (B), (C), and (D) each time the second logical volume is updated with data from the second host computer so that the first logical volume of data stored on the first storage system mirrors the second logical volume of data stored on the second storage system.

23. The method of claim 22, further including steps of:
(F) receiving, at the second storage system, the first set of data transmitted from the first storage system to the second storage system via the at least one communication path; and
(G) updating the second logical volume of data stored on the second storage system with the second set of data transmitted from the first storage system.

24. The method of claim 23, further including a step of:
(H) repeating the steps (A), (F) and (G) each time the first logical volume is updated with data from the first host computer so that the second logical volume of data stored on the second storage system mirrors the first logical volume of data stored on the second storage system.

25. The method of claim 20, wherein the first and second host computers include, respectively, first and second network servers connected to a network cloud, and wherein the method further includes a step of:
(D) serving data from at least one of the first and second logical volumes of data to a client via the network cloud.

26. The method of claim 20, wherein the first host computer includes a first Web server connected to the Internet, and wherein the method further includes a step of:
(D) implementing a first Web site on the first Web server, thereby giving Web users access to the first logical volume of data via the Internet.

27. The method of claim 26, wherein the second host computer includes a second Web server connected to the internet and implementing a second Web site, wherein the first and second Web sites share a common Internet address, wherein the computer system further includes at least one load controller coupled to at least one of the first and second servers to direct each Web user using the common Internet address to one of the first and second Web sites so that the first and second Web sites together act as a single virtual Web site, and wherein the method further includes a step of:
(E) in response to a Web user using the common Internet address to access the virtual Web site, directing the user to one of the first and second Web sites.

28. The method of claim 19, further including steps of:
(D) receiving, at the second storage system, the first set of data transmitted from the first storage system to the second storage system via the at least one communication path; and
(E) updating a second logical volume of data stored on the second storage system with the first set of data transmitted from the first storage system.

29. The method of claim 28, further including a step of:
(F) repeating the steps (A), (D) and (E) each time the first logical volume is updated with data from the first host computer so that the second logical volume of data stored on the second storage system mirrors the first logical volume of data stored on the second storage system.

30. The method of claim 28, further including a step of:
(F) in response to the second set of data being transferred from the second host computer to the second storage system to update the second logical volume of data, transmitting the second set of data from the second storage system to the first storage system.

31. The method of claim 19, wherein the at least one communication path includes a network cloud, and wherein:
the step (A) includes a step of transmitting the first set of data from the first storage system to the second storage system via the network cloud; and
the step (B) includes a step of receiving the second set of data via the network cloud.

32. The method of claim 19, wherein the at least one communication path includes at least one communication link dedicated to directly coupling the first and second storage systems, and wherein:
the step (A) includes a step of transmitting the first set of data from the first storage system to the second storage system via the communication link; and
the step (B) includes a step of receiving the second set of data via the communication link.

33. The method of claim 32, wherein the at least one communication link includes multiple communication links dedicated to directly coupling the first and second storage systems, and wherein:
the step (A) includes a step of transmitting the first set of data from the first storage system to the second storage system via the multiple communication links; and
the step (B) includes a step of receiving the second set of data via the multiple communication links.

34. The method of claim 32, wherein the at least one communication link includes multiple communication links dedicated to directly coupling the first and second storage systems, and wherein:
the step (A) includes a step of transmitting the first set of data from the first storage system to the second storage system via at least one of the multiple communication links; and
the step (B) includes a step of receiving the second set of data via at least one of the multiple communication links.

35. The method of claim 19, wherein the at least one communication path includes at least one data communication channel operable within a public communications network, and wherein:
the step (A) includes a step of transmitting the first set of data from the first storage system to the second storage system via the at least one data communication channel; and
the step (B) includes a step of receiving the second set of data via the at least one data communication channel.

36. The method of claim 35, wherein the at least one data communication channel includes multiple data communication channels operable within a public communications network, and wherein:
the step (A) includes a step of transmitting the first set of data from the first storage system to the second storage system via at least one of the multiple data communication channels; and
the step (B) includes a step of receiving the second set of data via at least one of the multiple data communication channels.

37. In a computer system including first and second host computers and first and second storage systems, wherein the first storage system includes at least one physical storage device and is coupled to the first host computer to store data transferred from the first host computer to the first storage system and the second storage system includes at least one physical storage device and is coupled to the second host computer to store data transferred from the second host computer to the second storage system, a method of maintaining coherence between a data set shared by the first and second host computers and stored on the first and second storage systems, the method comprising steps of:

(A) updating the data set in the first storage system by writing the data set in the first storage system with a first group of data written to the first storage system by the first host computer;

(B) receiving, at the first storage system, a second group of data that is sourced from the second storage system via at least one communication path that does not pass through the first host computer; and (C) overwriting at least a portion of the first group of data in the first storage system with at least a portion of the second group of data received from the second storage system.

38. In a computer system including first and second host computers and first and second storage systems, wherein the first storage system includes at least one physical storage device and is coupled to the first host computer to store data transferred from the first host computer to the first storage system and the second storage system includes at least one physical storage device and is coupled to the second host computer to store data transferred from the second host computer to the second storage system, a method of maintaining coherence between first and second copies of a data set stored, respectively, on the first and second storage systems, the method comprising steps of:

(A) in response to a first group of data being written to the first copy of the data set by the first host computer, transmitting the first group of data from the first storage system to the second storage system over at least one communication path that does not pass through the first host computer so that the first group of data can be stored on the second storage system;

(B) receiving at the first storage system, via the at least one communication path, a second group of data written to the second copy of the data set by the second host computer; and (C) overwriting at least a portion of the first group of data in the first storage system with at least a portion of the second group of data.

39. A computer system, comprising:

a first host computer;

a first storage system coupled to the first host computer to store data accessible to the first host computer, the first storage system including at least one physical storage device that stores a first plurality of logical volumes of data that are visible to and writable by the first host computer;

a second host computer;

a second storage system coupled to the second computer to store data accessible to the second host computer, the second storage system including at least one physical storage device that stores a second plurality of logical volumes of data that are visible to and writable by the second host computer;

at least one communication path coupled between the first and second storage systems to transfer data between the first and second storage systems, the at least one communication path not passing through the first host computer; and at least one controller that mirrors one of the first plurality of logical volumes in one of the second plurality of logical volumes by transmitting updates written from the first host computer to the one of the first plurality of logical volumes to the one of the second plurality of logical volumes over the at least one communication path.

40. The computer system of claim 39, wherein the at least one controller further mirrors the one of the second plurality of logical volumes in the one of the first plurality of logical volumes by transmitting updates from the second host computer to the one of the second plurality of logical volumes to the one of the first plurality of logical volumes over the at least one communication path.

41. The computer system of claim 40, wherein the first and second host computers include, respectively, first and second network servers connected to a network cloud to serve data from the first and second pluralities of logical volumes of data to network users via the network cloud.

42. The computer system of claim 41, wherein the network cloud includes the at least one communication path.

43. The computer system of claim 39, wherein the at least one communication path includes a network cloud.

44. The computer system of claim 39, wherein the at least one communication path includes at least one communication link dedicated to directly coupling the first and second storage systems.

45. The computer system of claim 44, wherein the first and second host computers include, respectively, first and second Web servers connected to the Internet to serve data from the first and second pluralities of logical volumes of data to Web users via the Internet.

46. The computer system of claim 45, wherein the first and second Web sites share a common Internet address, and wherein the computer system further includes at least one load controller coupled to at least one of the first and second servers to direct each Web user using the common Internet address to one of the first and second Web sites so that the first and second Web sites together act as a single virtual Web site.

47. The computer system of claim 39, wherein the at least one communication path includes at least one data communication channel operable within a public communications network.

48. The computer system of claim 39, wherein the first and second host computers include, respectively, first and second network servers connected to a network cloud to serve data from the first and second pluralities of logical volumes of data to network users via the network cloud.

49. The computer system of claim 42, wherein the first and second computers include, respectively, first and second Web servers connected to the Internet to serve data from the first and second pluralities of logical volumes of data to Web users via the Internet.

50. The computer system of claim 49, wherein the first and second Web sites share a common Internet address, and wherein the computer system further includes at least one load controller coupled to at least one of the first and second servers to direct each Web user using the common Internet address to one of the first and second Web sites so that the first and second Web sites together act as a single virtual Web site.

51. The computer system of claim 39, wherein the at least one controller includes means for mirroring one of the first plurality of logical volumes in one of the second plurality of logical volumes by transmitting updates from the first host computer to the one of the first plurality of logical volumes to the one of the second plurality of logical volumes over the at least one communication path.

52. A first storage system for use in a computer system including a first computer to be coupled to the first storage system, a second computer, and a second storage system coupled to the second computer, the second storage system including at least one physical storage device that stores a second plurality of logical volumes of data that are visible to and writable by the second computer, the computer system further including at least one communication path coupled between the first and second storage systems to transfer data between the first and second storage systems, the at least one communication path not passing through the first computer, the first storage system comprising:
- at least one physical storage device that stores a first plurality of logical volumes of data that are visible to and writable by the first computer; and
- at least one write controller that updates the first plurality of logical volumes with data received from the first computer, the at least one write controller being further adapted to update at least one of the first plurality of logical volumes with data received from the second storage system over the at least one communication path.

53. The first storage system of claim 52, further including at least one mirroring controller that mirrors the at least one of the first plurality of logical volumes to one of the second plurality of logical volumes by transmitting data updates, received from the first computer and directed to the at least one of the first plurality of logical volumes, to the one of the second plurality of logical volumes over the at least one communication path.

54. The first storage system of claim 53, wherein at least one mirroring controller includes means for mirroring the at least one of the first plurality of logical volumes to one of the second plurality of logical volumes by transmitting data updates, received from the first computer and directed to the at least one of the first plurality of logical volumes, to the one of the second plurality of logical volumes over the at least one communication path.

55. The first storage system of claim 52, wherein the at least one communication path includes a network cloud, and wherein the first storage system further includes a network interface controller to permit the first storage system to communicate with the second storage system via the network cloud.

56. The first storage system of claim 52, wherein the at least one communication path includes at least one communication link dedicated to directly coupling the first and second storage systems, and wherein the first storage system further includes an interface controller to permit the first storage system to communicate with the second storage system via the at least one communication link.

57. The first storage system of claim 52, wherein the at least one write controller includes means for updating the first plurality of logical volumes with data received from the first computer, and means for updating at least one of the first plurality of logical volumes with data received from the second storage system over the at least one communication path.

58. A first storage system for use in a computer system including a first computer, a second computer, a second storage system including at least one physical storage device, and at least one communication path, wherein the first computer is coupled to the first storage system, wherein the second computer is coupled to the second storage system to permit the second computer to update a second set of data stored by the second storage system, and wherein the at least one communication path is coupled between the first and second storage systems to transfer data between the first and second storage systems, the at least one communication path not passing through the first computer, the first storage system comprising:
- at least one physical storage device that stores a first set of data; and
- at least one write controller, coupled to the at least one physical storage device, to update at least one portion of the first set of data with data received both from the first computer and from the second storage system via the at least one communication path.

59. The first storage system of claim 58, wherein the at least one write controller includes means for updating the at least one portion of the first set of data with data received both from the first computer and from the second storage system via the at least one communication path.

60. A computer readable medium encoded with a plurality of instructions for execution by at least one processor included in a first storage system including at least one physical storage device, the first storage system for use in a computer system including first and second computers and a second storage system including at least one physical storage device, wherein the first storage system is to be coupled to the first computer to store data transferred from the first computer to the first storage system and the second storage system is to be coupled to the second computer to store data transferred from the second computer to the second storage system, the plurality of instructions, when executed by the at least one processor, causing the at least one processor to perform steps of:
- (A) updating a first logical volume of data stored on the first storage system with a first set of data transferred from the first computer to the first storage system; and
- (B) updating the first logical volume of data stored on the first storage system with a second set of data received from the second storage system, the second set of data being received via at least one communication path that does not pass through the first computer.

61. A computer readable medium encoded with a plurality of instructions for execution by at least one processor included in a first storage system including at least one physical storage device, the first storage system for use in a computer system including first and second computers and a second storage system including at least one physical storage device, wherein the first storage system is to be coupled to the first computer to store data transferred from the first computer to the first storage system and the second storage system is to be coupled to the second computer to store data transferred from the second computer to the second storage system, the plurality of instructions, when executed by the at least one processor, causing the at least one processor to perform steps of:
- (A) in response to a first logical volume of data stored on the first storage system being updated with a first set of data transferred from the first computer to the first storage system, causing the first set of data to be transmitted from the first storage system to the second storage system over at least one communication path that does not pass through either of the first and second computers; and
- (B) updating the first logical volume of data stored on the first storage system with a second set of data received from the second storage system, the second set of data being received via the at least one communication path.

* * * * *